United States Patent [19]

Yamada et al.

[11] Patent Number: 5,523,858

[45] Date of Patent: Jun. 4, 1996

[54] FACSIMILE APPARATUS

[75] Inventors: Masakatsu Yamada, Kawasaki; Minoru Yokoyama, Yokohama; Hideyuki Terashima, Sagamihara, all of Japan

[73] Assignee: Canon Kabushiki Kaisha, Tokyo, Japan

[21] Appl. No.: 145,590

[22] Filed: Nov. 4, 1993

[30] Foreign Application Priority Data

Nov. 11, 1992 [JP] Japan ..................... 4-300814
Nov. 16, 1992 [JP] Japan ..................... 4-305116

[51] Int. Cl.$^6$ ..................................................... H04N 1/36
[52] U.S. Cl. ........................ 358/412; 358/400; 358/421; 358/413; 358/434; 358/496; 358/498; 358/296; 271/9.01
[58] Field of Search ......................... 358/412, 410, 358/409, 418, 421, 474, 498, 496, 472, 296, 300, 400, 500, 401, 501, 413; 271/9; 355/308; H04N 1/40

[56] References Cited

U.S. PATENT DOCUMENTS 5,206,737   4/1993   Sugiyama ..................... 358/498
5,226,639   7/1993   Kida et al. ..................... 271/9

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

A facsimile apparatus designed for reduced power consumption, a smaller number of component parts, smaller size, lighter weight and lower cost includes an original reading section having a contact-type line image sensor and a first biasing roller driven so as to be rotated in a state in which the contact-type line image sensor is biased, a recording section arranged in the vicinity of the original reading section and having a line thermal head and a second biasing roller driven so as to be rotated in a state in which the line thermal head is biased, a driving mechanism in which a reversible motor is used as a drive source, a rocking mechanism for driving solely the first biasing roller when the motor is rotatively driven in one direction and driving both the first and second biasing rollers when the motor is rotatively driven in the other direction, and a power transmission mechanism in which the rocking mechanism is arranged in a power transmission system for driving the first and second biasing rollers. The rocking mechanism drives solely the first biasing roller at the end of each operation (transmission, reception, copying), with the second biasing roller being made free and independent of the power transmission mechanism. As a result, recording paper clamped between the second biasing roller and the thermal head can be pulled out with ease.

10 Claims, 22 Drawing Sheets

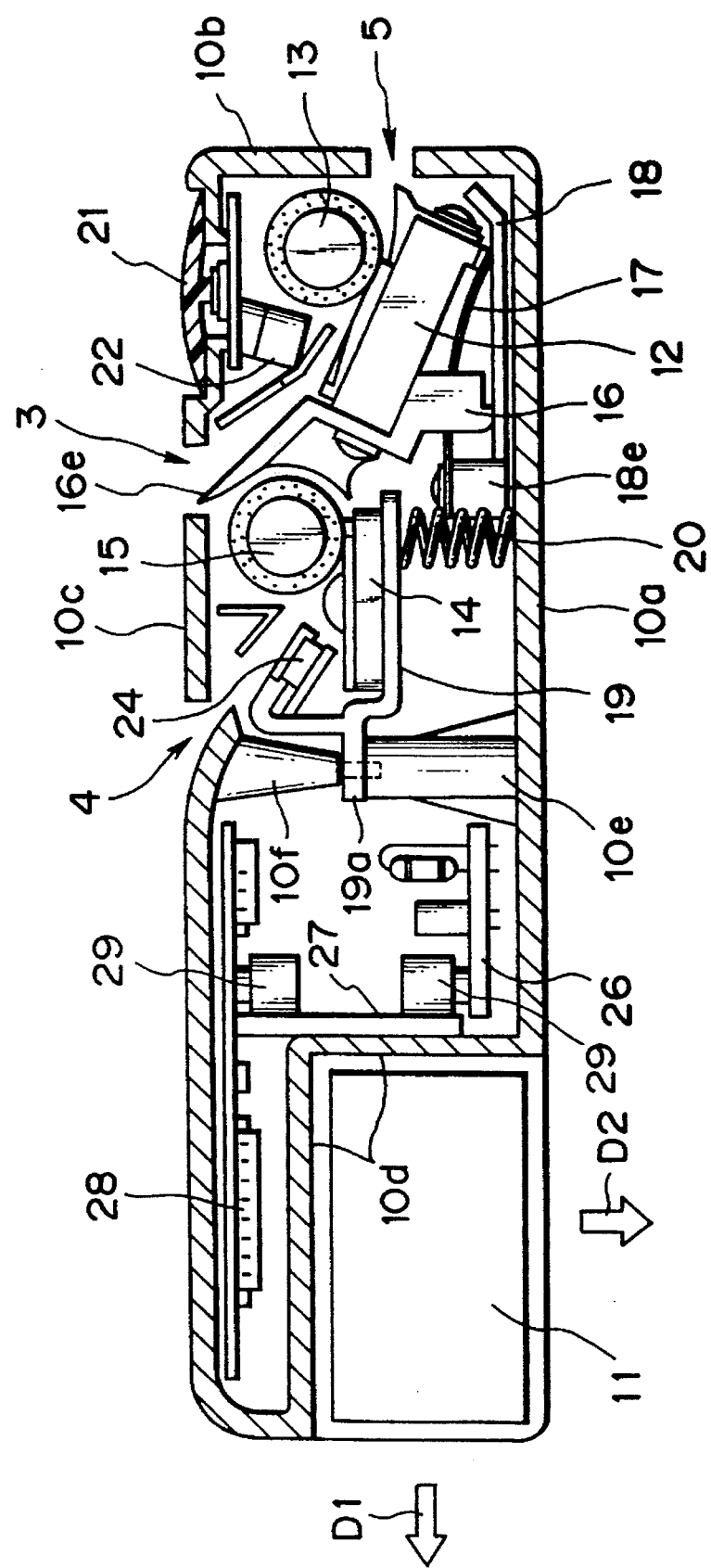

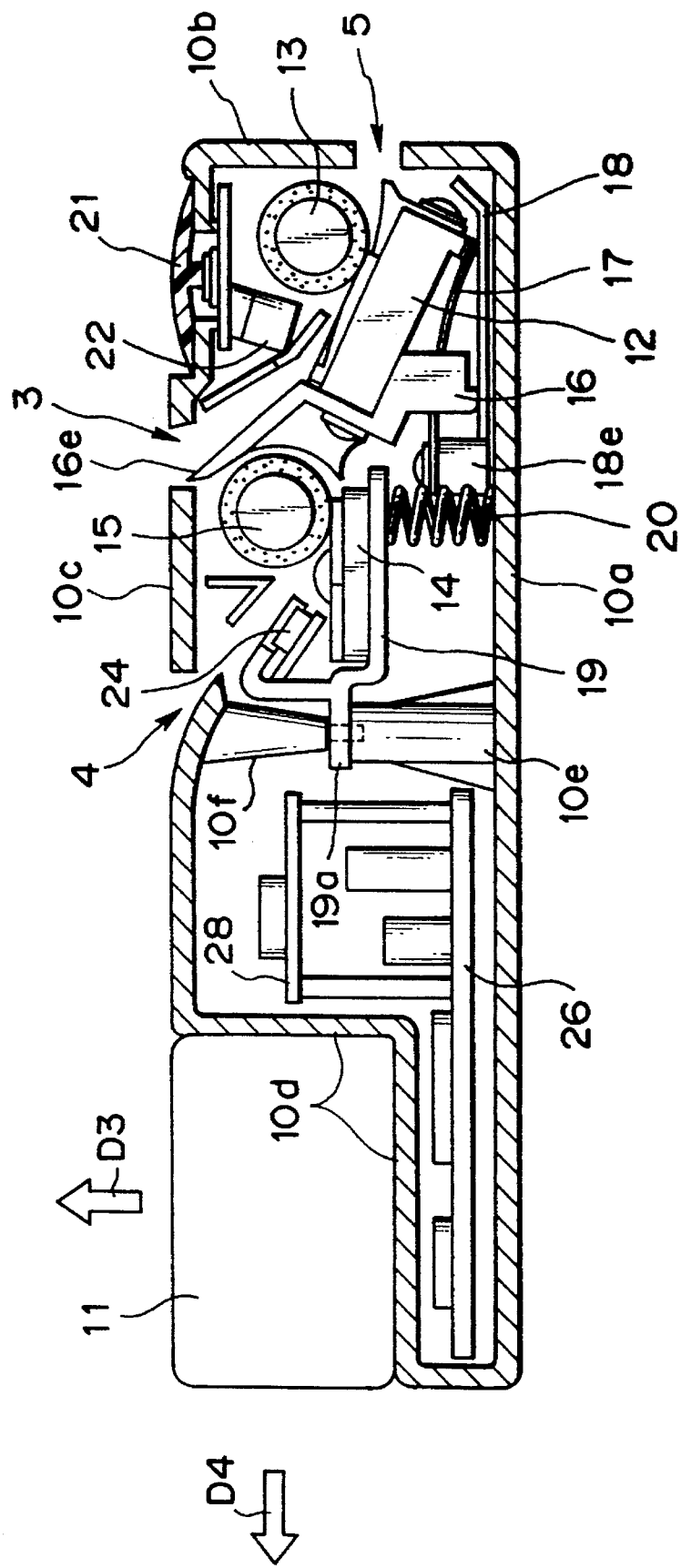

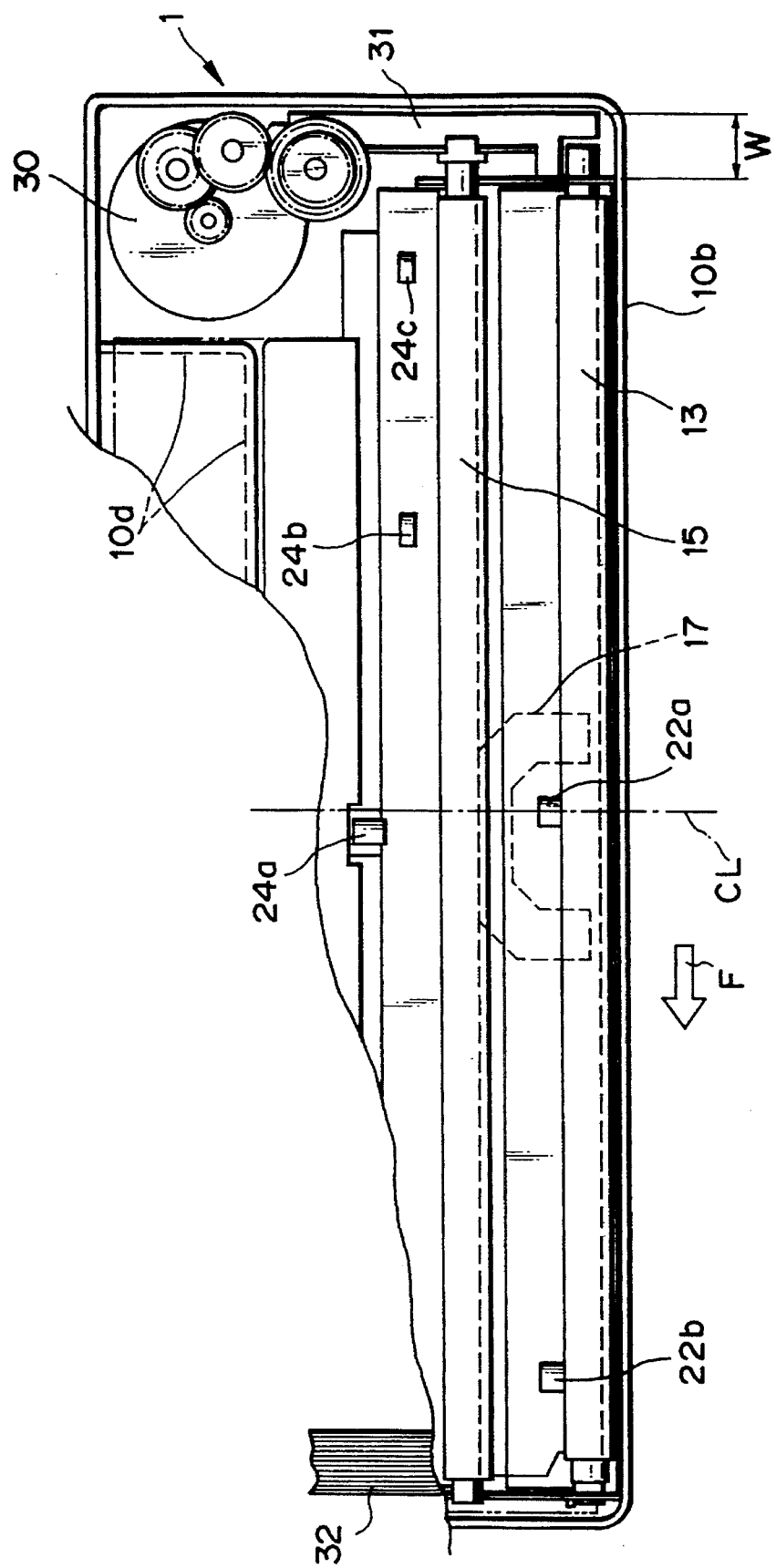

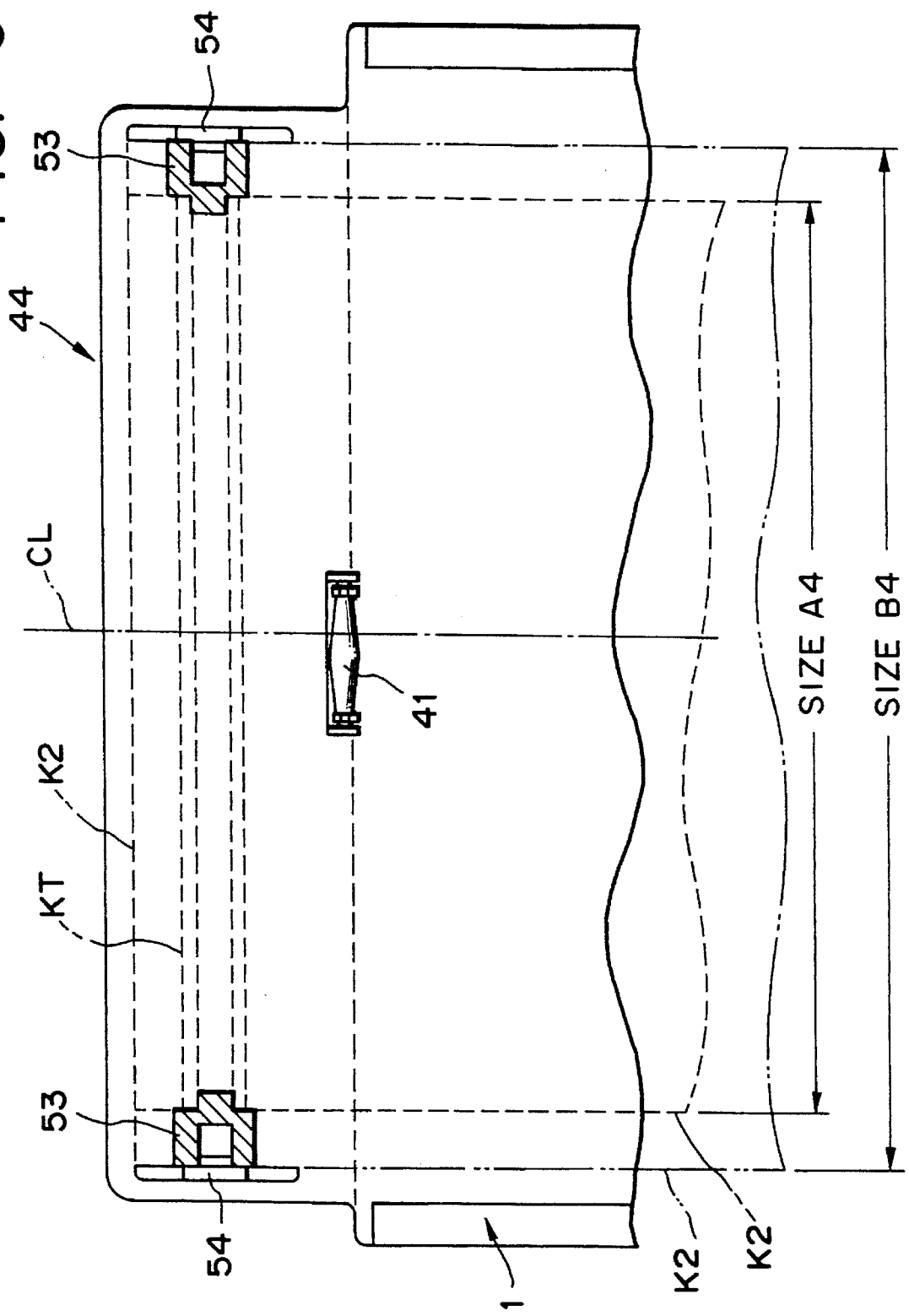

FIG. 21A $$\frac{1}{i_T} = \frac{P_{64}}{P_{65}} \times \frac{P_{65}}{P_t} \times \frac{1}{i} = \frac{P_{64}}{P_c} \times \frac{1}{i}$$

$$\frac{1}{i_{c1}} = \frac{P_{64}}{P_{66}} \times \frac{P_{66}}{P_c} \times \frac{1}{i} = \frac{P_{64}}{P_c} \times \frac{1}{i}$$

$$\frac{1}{i_{c2}} = \frac{P_{64}}{P_{65}} \times \frac{P_{65}}{P_{69}} \times \frac{P_{69}}{P_c} \times \frac{1}{i} = \frac{P_{64}}{P_c} \times \frac{1}{i}$$

$$\therefore \frac{1}{i_{c1}} = \frac{1}{i_{c2}}$$

----- A FORMULA

FIG. 21B $$\frac{1}{i_T} \times T = \frac{1}{i_{c1}} \times C \qquad \text{----------- B FORMULA}$$

$$\frac{P_{64}}{P_t} \times \frac{1}{i} \times T = \frac{P_{64}}{P_c} \times \frac{1}{i} \times C \qquad \text{----- C FORMULA}$$

$$\frac{T}{P_t} = \frac{C}{P_c} \qquad \text{----------------- D FORMULA}$$

FACSIMILE APPARATUS

BACKGROUND OF THE INVENTION

This invention relates to a facsimile apparatus and, more particularly, to a facsimile apparatus constructed to be light in weight and small in size.

In a small-size facsimile apparatus known in one example of the prior art, the recording section and reading section of the apparatus are constructed separately of each other. In accordance with this apparatus, the reading section is composed of an image sensor and a first biasing roller rotatively driven while in a biased state with respect to the image sensor. The reading section is provided with a first pressure-release mechanism for separating the biased first biasing roller from the image sensor. The recording section is composed of a thermal head and a second biasing roller biased with respect to the thermal head. The recording section is provided with a second pressure-release mechanism for separating the second biasing roller from the thermal head.

If an original or a sheet of recording paper becomes jammed when being set or during conveyance in the arrangement described above, the first or second pressure-release member is operated in order to restore the apparatus to the normal condition. More specifically, the first pressure-release mechanism is operated to separate the first biasing roller, which is in the biased state, from the image sensor, and the second pressure-release mechanism is operated to separate the second biasing roller, which is in the biased state, from the thermal head. In other words, the first and second pressure-release mechanisms are provided specially for the purpose of eliminating trouble when conveying an original or sheet of recording paper.

The recording section and reading section of a conventional small-size facsimile apparatus according to another example of the prior art will be described briefly with reference to FIG. 22.

FIG. 22 is a transverse sectional view illustrating a facsimile apparatus according to the prior art. This represents an example of the, smallest, flattest arrangement said to be available at the present time. A cover 200 serving also as a casing has a top side provided with a first opening 203 in the vicinity of the edge thereof, and a second opening 204 located further to the rear. The casing cover 200 also has a front side provided with an exit port 205.

In this arrangement, an original G is placed face down and inserted into the first opening 203. The original is conveyed and discharged from the exit port 205 while clamped between a contact-type line image sensor 12 and a first biasing roller 13 rotatively driven in a state biased with respect to the line image sensor 12.

A roll KR of thermosensitive recording paper K2 is replaceably supported in a freely rotatable manner (in the direction indicated by the arrow) on the underside of the cover 200. The recording paper K2 is so arranged that its recording side opposes the recording portion of a line thermal head 14. The recording paper K2 is clamped between the line thermal head 14 and a second biasing roller 15 rotatively driven while biased with respect to the head 14. While thus clamped, the recording paper K2 is discharged to the exterior of the apparatus via the second opening 204 after being recorded on.

By virtue of the configuration described above, the reading section and the recording section are arranged to overlap in the thickness direction of the casing cover 200, thereby making it possible to greatly reduce the thickness of the casing cover 200.

In the first example of the prior art described above, the fact that the first and second pressure-release mechanisms are provided complicates the overall mechanism of the apparatus and enlarges the size of the overall apparatus.

Moreover, in accordance with this facsimile apparatus, drive motors for the first and second biasing rollers are independent of each other. As a consequence, the power consumed when driving the rollers is great, there are a large number of component parts and the apparatus is heavy.

Accordingly, a first object of the present invention is to provide a facsimile apparatus in which special-purpose release mechanisms for releasing the pressing force on rollers provided in the reading and recording sections are eliminated while still allowing unjamming of the apparatus and extraction of the original and recording paper, thereby making it possible to reduce the size of the apparatus, the number of parts and manufacturing cost by virtue of a simpler structure for the reading section and recording section.

In the second example of the prior-art facsimile apparatus shown in FIG. 22, the drive motors for the first and second biasing rollers similarly are independent of each other and, hence, the power consumed when driving the rollers is great, there are a large number of component parts and the apparatus is heavy.

Though an arrangement in which the first biasing roller is driven by rotating one drive motor in one direction and the second biasing roller is driven by rotating this drive motor in the opposite direction is possible if each roller is provided with a one-way clutch mechanism, this will not allow both rollers to be driven simultaneously. In a copying operation, therefore, first one roller must be driven, the information obtained by reading the original must be stored in memory, and then the other roller must be driven to perform recording. This is disadvantageous since twice as much time is required to make a copy. Another drawback is higher cost owing to the need for the memory.

Accordingly, a second object of the present invention is to provide a facsimile apparatus that can be made small in size and light in weight, wherein a common drive source is used for the drive rollers of the original and recording paper, thereby making it possible to reduce power consumption, the number of component parts and manufacturing cost.

SUMMARY OF THE INVENTION

According to the present invention, the foregoing objects are attained by providing a facsimile apparatus comprising an original reading section having a contact-type line image sensor and a first biasing roller driven so as to be rotated in a state in which the contact-type line image sensor is biased, a recording section arranged in the vicinity of the original reading section and having a line thermal head and a second biasing roller driven so as to be rotated in a state in which the line thermal head is biased, drive means in which a reversible motor is used as a drive source, a rocking mechanism for driving solely the first biasing roller when the motor is rotatively driven in one direction and driving both the first and second biasing rollers when the motor is rotatively driven in the other direction, and a power transmission mechanism in which the rocking mechanism is arranged in a power transmission system for driving the first and second biasing rollers.

The rocking mechanism drives only the first biasing roller at the end of each operation (transmission, reception and copying), as a result of which the second biasing roller is freed by being made independent of the power transmission mechanism. Accordingly, it is easy to extract the recording paper clamped between the second biasing roller and the thermal head.

Even in a state in which the second biasing roller is meshing with the power transmission mechanism, the original clamped between the second biasing roller and the image sensor may be pulled in the direction in which the original is conveyed, thereby making it possible to separate the rocking mechanism from the side of the second biasing roller owing to the characteristic of the rocking mechanism. This makes it easy to extract the original. Accordingly, even though the aforementioned first and second pressure-release mechanisms of the prior art are not provided, it is possible to achieve recovery from an abnormal condition, such as jamming of the original or recording paper. This also makes it possible to realize a facsimile apparatus of smaller size.

Further, in preferred embodiment of the invention, there is provided a facsimile apparatus constructed to have a flat, compact configuration, comprising a base portion, an original reading section having a contact-type line image sensor and a first biasing roller rotatably supported on the base portion so as to be rotated in a state in which the contact-type line image sensor is biased, the first biasing roller having a gear fixed thereto, a recording section arranged in the vicinity of the original reading section and having a line thermal head and a second biasing roller rotatably supported on the base portion so as to be rotated in a state in which the line thermal head is biased, the second biasing roller having a gear fixed thereto, drive means secured to the base portion and having a reversible motor used as a drive source, a rocking mechanism meshing with each of the gears so as to drive solely the first biasing roller when the motor is rotatively driven in one direction and drive both the first and second biasing rollers when the motor is rotatively driven in the other direction, and a power transmission mechanism in which the rocking mechanism is arranged in a power transmission gear system for driving the first and second biasing rollers. This embodiment makes it possible to reduce power consumption, the number of component parts, the size and weight of the apparatus and manufacturing cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a transverse sectional view showing the facsimile apparatus of FIGS. 1A and 1B;

FIG. 3 is a transverse sectional view showing a slender facsimile apparatus according to a second embodiment;

FIG. 4 is a plan view showing the slender facsimile apparatus according to the first and second embodiments;

FIG. 9 is a plan view showing the slender facsimile apparatus in use after being combined with the roll-sheet holder;

FIGS. 21A, 21B show relations associated with a roller drive mechanism; and

DESCRIPTION OF THE PREFERRED EMBODIMENTS

Figure 1A:
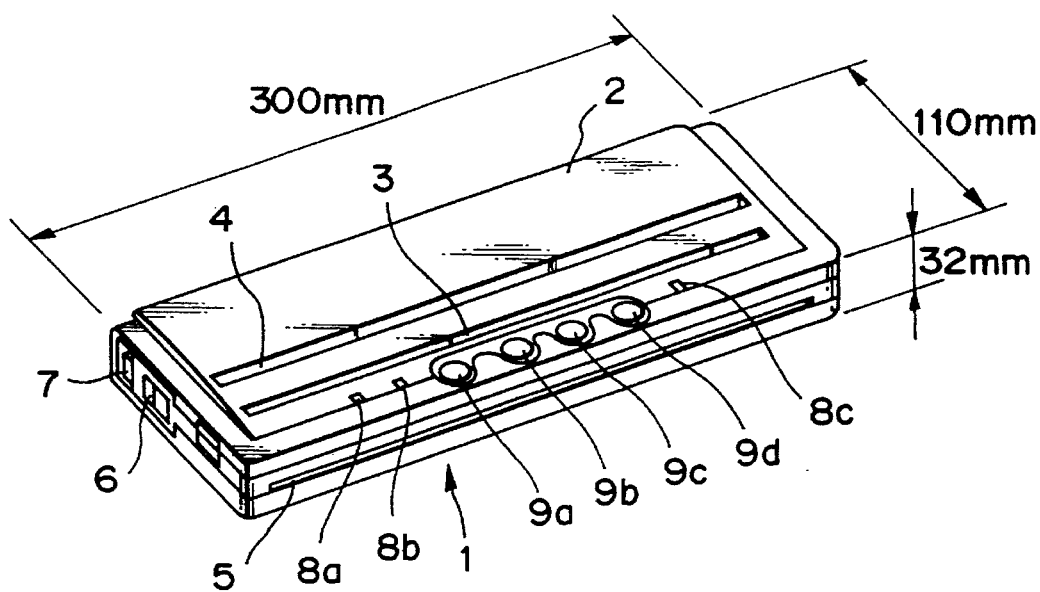
FIG. 1A is an external perspective view showing a slender facsimile apparatus according to a first embodiment.
Figure 1B:
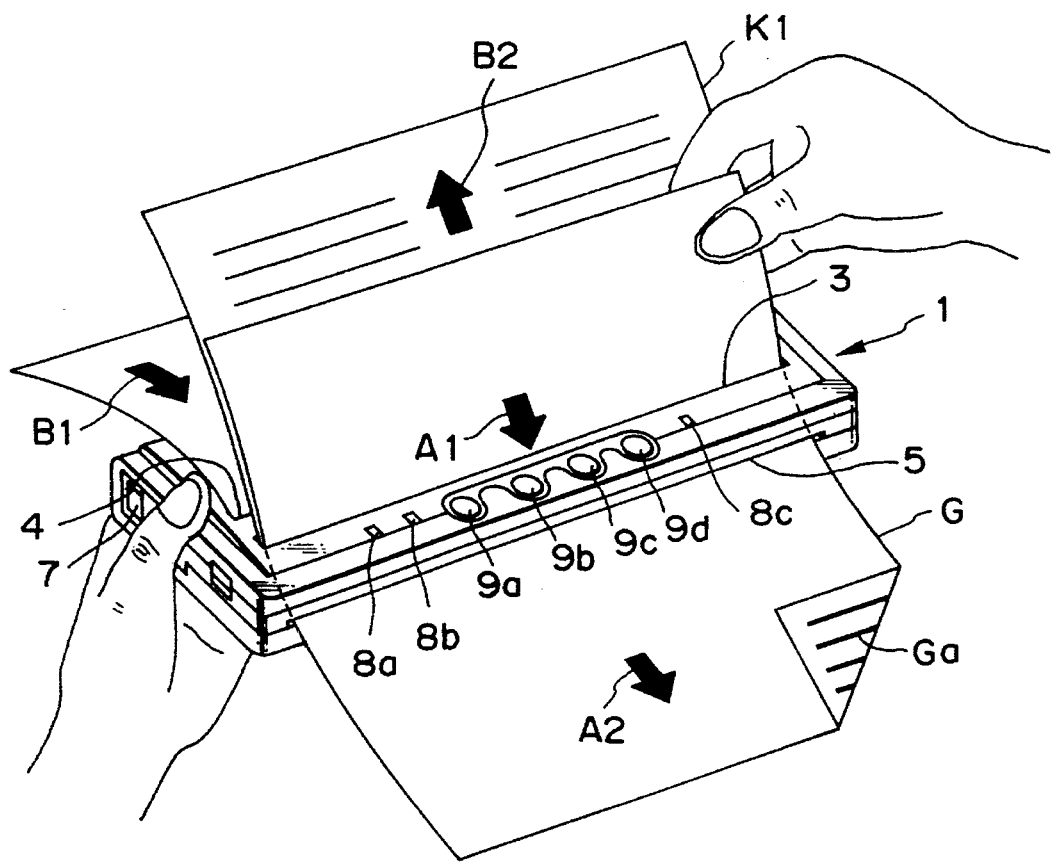
FIG. 1B is an external perspective view showing the slender facsimile apparatus in use.

Preferred embodiments of the present invention will now be described in detail with reference to the drawings. FIG. 1A is an external perspective view showing a portable facsimile apparatus 1 according to a first embodiment of the invention. Here the apparatus is shown before an original and recording paper have been set in place. FIG. 1B is an external perspective view showing the portable facsimile apparatus in use. Specifically, here an original G and recording paper K1 have been set in place, after which they are conveyed in the directions indicated by the arrows.

As shown in FIG. 1A, a casing cover 2 is produced by the injection molding of resin or the like and is formed so as to be capable of being separated into upper and lower halves. As indicated by the dimensions shown in FIG. 1A, the casing cover 2 is small in size, having a width of 300 mm, a breadth of 110 mm and a thickness of 32 mm. As a result, the facsimile apparatus 1 can readily be carried about in an ordinary brief case or attaché case. The case cover has an internal battery power supply and facsimile function, which will be described later. If the portable facsimile apparatus is connected to a prescribed telephone line, it can be used outdoors and in an automobile or the like to provide a portable facsimile function. Furthermore, it is possible to downsize the facsimile apparatus.

The case cover 2 of the portable facsimile apparatus 1 having the aforementioned external dimensions has an upper side in FIG. 1A formed to include a first opening 3 having a width that will allow the insertion of an original up to a maximum width of size B4, and a second opening 4 having a width for inserting recording paper having a maximum width of size B4. The front side of the case cover 2 is formed to have an exit port 5 for discharging originals up to size B4 in terms of width.

The upper side of the case body 2 in the vicinity of one edge thereof is provided with operating switches 9 that include a switch 9a for setting a fine mode or standard mode, a switch 9b for setting a copy mode or feed mode, a stop switch 9c and a start switch 9d for starting operation in a transmitting state when an original has been set in place and in a receiving state when no original has been set in place. An LED 8c for indicating the power-on state is provided at the right of these switches, an LED 8a for indicating an operating error is provided at the left of the switches, and an LED 8b for displaying that the fine mode has been set is provided to the right of the LED 8a. A power-supply switch 7 and an external connector 6, which is for connecting the portable facsimile apparatus 1 to a telephone, are disposed on the left side of the apparatus 1.

As illustrated in FIG. 1B, an original G having a printed side Ga is inserted, with the side Ga facing down, into the first opening 3 in the direction of arrow A1, and the original is discharged from the apparatus via the exit port 5. A pre-cut sheet K1 of thermosensitive recording paper is inserted via the second opening 4 in the direction of arrow B1, after which it is discharged from the first opening 3 in the direction (upward) indicated by arrow B2. Thus, the facsimile apparatus 1 is capable of performing an operation for reading an original and a recording operation in units of the cut sheets of paper.

More specifically, the portable facsimile apparatus 1, having the flat, compact configuration described above, can be operated by holding the apparatus in one hand and inserting originals one sheet at a time using the other hand. For reception, the pre-cut sheet K1 of thermosensitive recording paper is inserted into the second opening 4 to allow reception of a document. If the user wishes to make a copy, the original G and cut sheet K1 are set in place simultaneously, without connecting the apparatus to a line, so that copies can be made one sheet at a time.

The internal construction of the facsimile apparatus is as shown in FIG. 2, which is a transverse cross section taken along a plane passing through one of the operating switches of the apparatus 1. The main components within the apparatus are illustrated. The case cover 2 comprises a cover bottom 10a, a cover top 10c, a cover front 10b and a battery receptacle 10d which, in combination with other portions, form a hollow case capable of accommodating various components. The cover top 10c is formed to have the first opening 3 and the second opening 4, and the cover front 10b is formed to have the exit port 5 substantially at the center thereof. The aforementioned switches are provided with a switch cover 21 performing the functions of a cover and display.

The construction of the original reading section will now be described. A CS (contact sensor) roller 13 serves as a first biasing roller for conveying the original G by a frictional force obtained by bringing the original G into contact with the original reading portion of a contact sensor 12. The CS roller 13 is freely rotatably supported on two sides obtained by bending up a base plate 18 made of metal or the like.

The CS roller 13 is biased at all times with respect to the reading portion of the contact sensor 12. Specifically, the contact sensor 12 is secured to a sensor base plate 16 rockably supported on the metal base plate 18. The combination of the sensor base plate 16 and contact sensor 12 are biased at all times toward the side of the CS roller 13 by a spring 17 one end of which is fixed to a stud 18e provided as an integral part of the metal base plate 18. The sensor base plate 16 has the transverse sectional shape shown in FIG. 2. The sensor base plate 16 is formed to have a sharp tip 16e for guiding the original G, the tip 16e being shaped to conform to the outer circumferential surface of a TPH roller 15 of a recording section, described later. Thus, the sensor base plate 16 is designed to guide a cut sheet to the first opening 3 and to allow the sheet to be torn off at the sharp tip 16e.

The construction of the recording section will now be described.

The aforementioned metal base plate 18 freely rotatably supports the TPH (thermal print head) roller 15, which is a second biasing roller for conveying the cut sheet K1 of thermosensitive recording paper. The TPH roller 15 conveys the cut sheet K1 by a frictional force obtained by bringing the cut sheet K1 into contact with the recording portion of a thermal head 14. To bring the cut sheet K1 into contact with the recording portion, the TPH roller 15 is in a state in which it is constantly biased with respect to the recording portion of the line thermal head 14. In order to attain this state, the line thermal head 14 is secured to a thermal head plate 19, as shown in FIG. 2. The thermal head plate 19 is retained, at a hole 19a provided therein, between a stud 10f projecting downward from the underside of the second opening 4 and a stud 10e projecting upward from the cover bottom 10a. Thus the thermal head plate 19 is capable of rocking freely and is prevented from falling off. The plate 19 is in a state in which it constantly biases the recording portion of the line thermal head 14 toward the side of the THP roller 15 by means of a coil spring 20 retained in a compressed state between the underside of the plate 19 and the metal base plate 18.

In order to place the CS roller 13 and TPH roller 15 in the constantly biased state and drive each roller with a lower load, the coefficient of friction of each roller with respect to the reading portion of the contact sensor or the recording portion of the line thermal head preferably is set to be smaller than the coefficient of friction of each roller with respect to the original or recording paper. Accordingly, a special material rather than ordinary rubber is used on the outer circumferential surface of the CS roller 13 and TPH roller 15.

As for the electronic boards which implement the facsimile function, a chip substrate 28 on the surface of which various components such as an LSI chip and IC chip are mounted and a discrete substrate 26 on which such components as a resistor, capacitor and diode are mounted via a reflow solder bath are arranged along the upper and lower walls of the case. These boards are connected via a connector board 27. By adopting this arrangement, the process for manufacturing the boards can be simplified and available space is not wasted.

The battery receptacle 10d is provided with a chargeable-type battery 11 capable of being loaded and unloaded in the directions of arrows D1, D2. The chargeable battery 11 can be a nickel-cadmium cell, which is capable of producing a high-power output.

In the arrangement described above, and as illustrated in FIG. 1B, the original G having the printed side Ga is inserted, with the side Ga facing down, into the first opening 3 in the direction of arrow A1 so as to be read in the reading section, after which the original is discharged from the apparatus via the exit port 5. The pre-cut sheet K1 of thermosensitive recording paper is inserted via the second opening 4 in the direction of arrow B1, whereupon the cut sheet is recorded upon. The cut sheet K1 is then discharged from the first opening 3 in the direction (upward) indicated by arrow B2. Thus, the facsimile apparatus 1 is capable of performing an operation for reading an original and a recording operation in units of the cut sheets of paper, i.e., one cut sheet at a time.

FIG. 3 is a transverse sectional view illustrating a second embodiment of the portable facsimile apparatus 1. Since the construction of the reading section and recording section is substantially the same as in the first embodiment, only the portions that differ from the first embodiment will be described. In FIG. 4, the battery receptacle 10d is formed in such a manner that the upper side and underside of the case are continuous so that the rechargeable battery 11 made be loaded and unloaded in the directions of arrows D3, D4. The chip substrate 28 and discrete substrate 26 are arranged on two different levels via the intermediary of a spacer.

In this arrangement also, and as illustrated in FIG. 1B, the original G having the printed side Ga is inserted, with the side Ga facing down, into the first opening 3 in the direction of arrow A1 so as to be read in the reading section, after which the original is discharged from the apparatus via the exit port 5. The cut sheet K1 of thermosensitive recording paper is inserted via the second opening 4 in the direction of arrow B1, whereupon the cut sheet is recorded upon. The cut sheet K1 is then discharged from the first opening 3 in the direction (upward) indicated by arrow B2. Thus, the facsimile apparatus 1 is capable of performing an operation for reading an original and a recording operation in units of the cut sheets of paper.

FIG. 4 is a plan view illustrating the portable facsimile apparatus 1. This shows the manner in which the reading section and the recording section are provided offset to the left side (in the direction of arrow F) relative to a center line CL of the apparatus. The reading section and the recording section in FIG. 4 will now be described, with these sections being represented by the positions at which the CS roller 13 and TPH roller 15 are disposed. The center position of each of the rollers 13, 15 is offset to the left side (in the direction of arrow F) relative to the center line CL. This provides a space of width W within the case of the apparatus. By providing a gear train 31 in this space, it is possible to transmit the driving force of a pulse motor 30, which is the driving source of the rollers.

The reading section is provided with DES sensors 22a, 22b for detecting whether originals of different sizes are present or not, and the recording section is provided with RPS (recording paper size) sensors 24a, 24b for detecting whether recording paper of different sizes is present. The positions of these sensors are as illustrated.

Figure 5A:
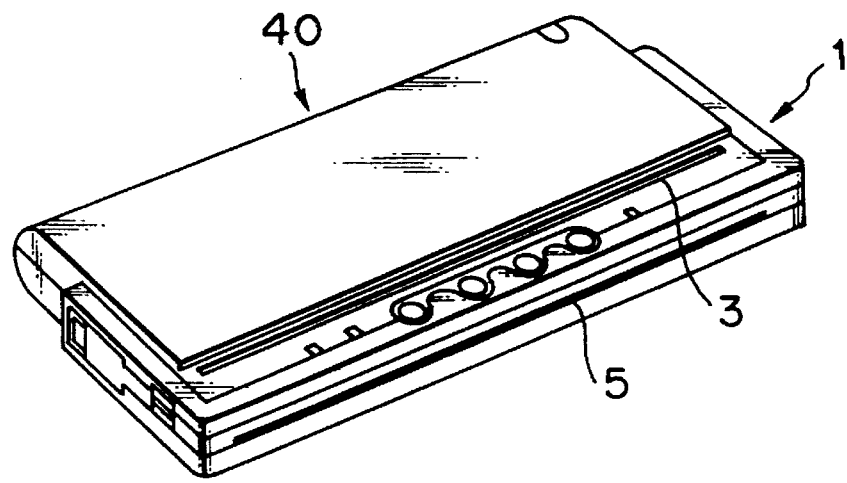
FIG. 5A is an external perspective view showing the slender facsimile apparatus after being combined with a roll-sheet holder.
Figure 5B:
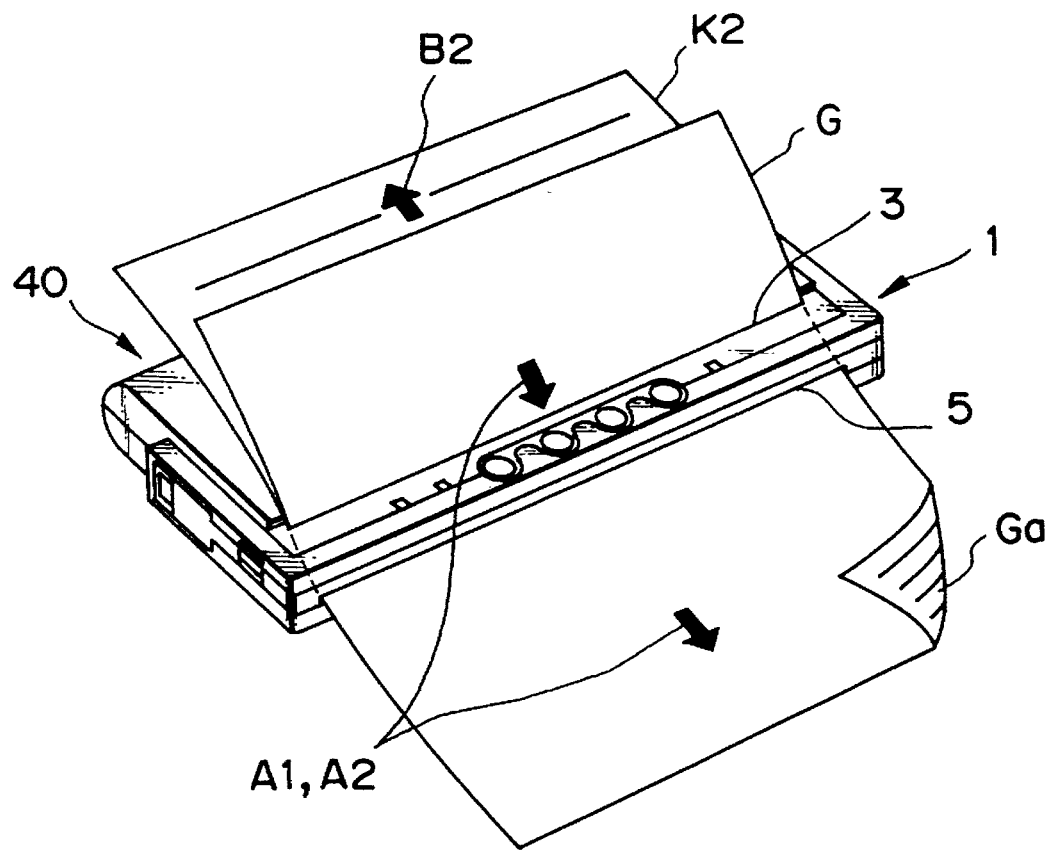
FIG. 5B is an external perspective view showing the slender facsimile apparatus in use after being combined with the roll-sheet holder.

FIG. 5A is an external perspective view showing the ultracompact facsimile apparatus 1 of FIG. 1 after it is combined with a roll-sheet holder 40, and FIG. 5B is an external perspective view showing the facsimile apparatus in use after being combined with the roll-sheet holder 40. In FIG. 5A, the facsimile apparatus 1 is provided with a roll-sheet holder 40 consisting of a heat-resistant resin material and capable of being attached and detached at will. When the holder 40 is combined with the facsimile apparatus 1 as shown in FIG. 5A, the aforementioned switches, the first opening 3 and the external connector 6 are exposed.

When the facsimile apparatus 1 and holder 40 have been combined, the original G is inserted, with its printed side Ga faced down, from the first opening 3 and then is conveyed out from the exit port 5 in the direction of arrows A1, A2, as shown in FIG. 5B. A roll K2 of recording paper, which is obtained by rolling up a thermosensitive paper, is conveyed/discharged from below the first opening 3 to the exterior of the apparatus in the direction of arrow B2.

Figure 6A:
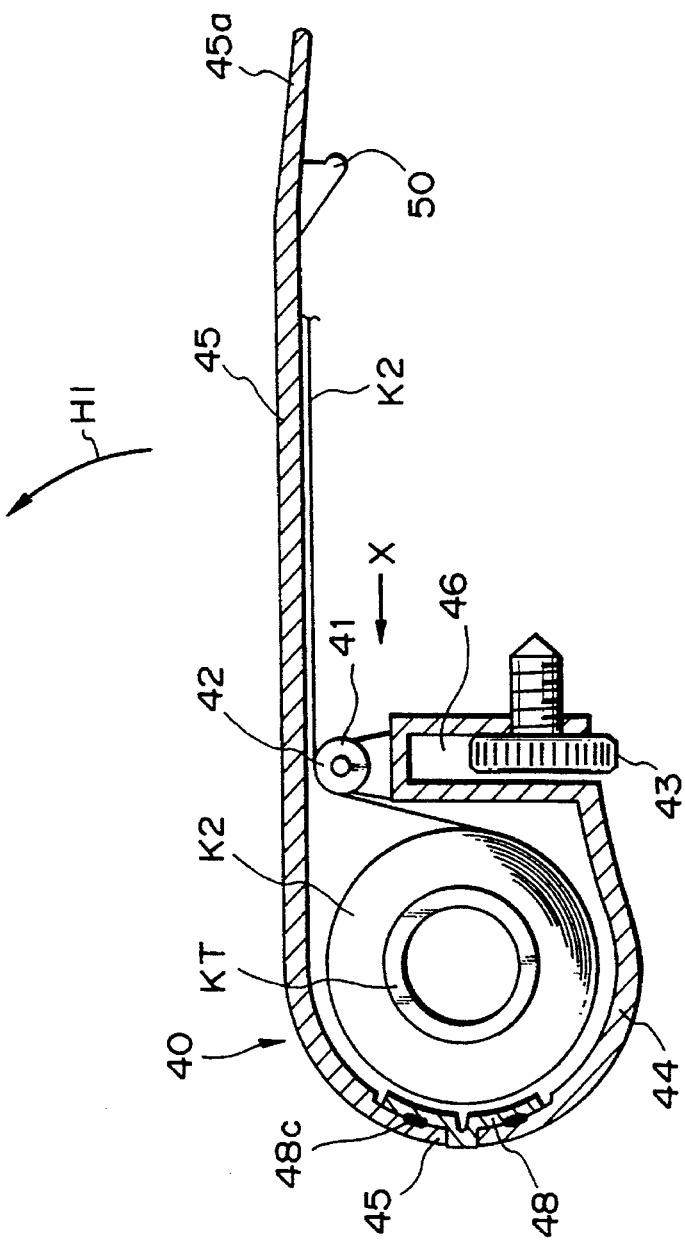
FIG. 6A is a transverse sectional view showing the roll-sheet holder.
Figure 6B:
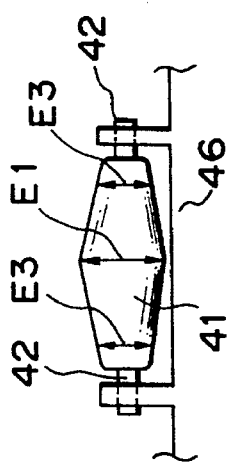
FIG. 6B is a sectional view seen along the arrow in FIG. 6A.

FIG. 6A is a transverse sectional view showing the roll-sheet holder, and FIG. 6B is a sectional view seen an along the arrow in FIG. 6A. As shown in FIG. 6A, the roll-sheet holder 40 includes a base portion 44 for accommodating the roll sheet K2, which is wound about a core KT, and mounting means 46 obtained by extending the right edge portion of the base 44. One side of a hinge 48 is fixed to the left edge (rear end) of the base portion 44, and a cover 45 having its end portion 45b secured to the other side of the hinge 48 is capable of being opened and closed freely in the direction of arrow H1. The cover 45 has a tip portion 45a of sufficient length in order to cover the second opening 4 of the facsimile apparatus 1. The cover 45 is formed to have a stopper 50. The cover 45 is capable of being held in the closed state by engaging the stopper 50 with the second opening 4.

A fixing screw 43 having a knurled portion is provided in the mounting portion 46 and is partially exposed so that it can be turned by a finger or the like. The upper part of the mounting portion 46 is provided with a bearing 42 rotatably supporting an alignment roller 41, which prevents the roll paper K2 from meandering or becoming skewed. The alignment roller 41 also guides the roll paper K2 between itself and the second opening 4 in a state spaced away from the upper side of the facsimile apparatus 1.

The alignment roller 41 has a drum-shaped configuration, as shown in FIG. 6B, in which the diameter E1 at the central portion is greater than the diameter E2 near the ends. As will be set forth later, tension is concentrated along the center line of the roll paper K2 by the alignment roller 41 so that the paper can be prevented from meandering or becoming skewed. Since the roll paper K2 can be guided while spaced away from the upper surface of the facsimile apparatus 1, the recording surface of the paper is prevented from being damaged.

Figure 7:
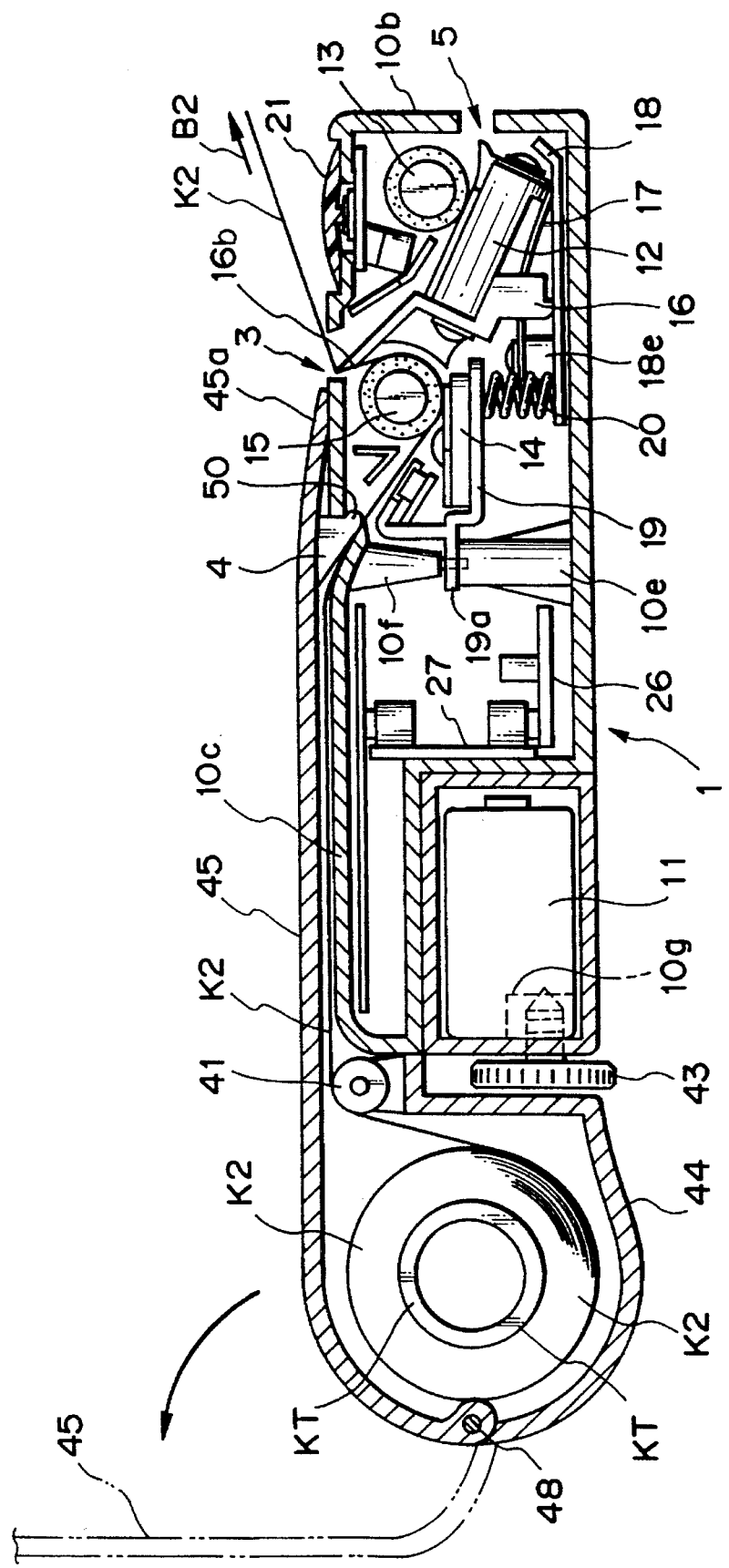
FIG. 7 is a transverse sectional view showing the slender facsimile apparatus in use after being combined with the roll-sheet holder.

FIG. 7 is a transverse sectional view showing the roll-sheet holder 40 and the facsimile apparatus 1 after being combined. The manner in which the roll paper K2 is torn off is illustrated. Portions in FIG. 7 that have already been discussed are designated by the same reference characters and need not be discussed again. A mounting screw 10g, which is indicated by the dashed line, is provided on one side or on both sides of the chargeable batter 11. The fixing screw 43 is capable of being turned freely to mount and fix the holder 40. The cover 45 is held by a rotary shaft 48, instead of the hinge mentioned earlier, so as to be capable of turning freely. The cover 45 may be opened to the position indicated by the two-dot chain line in FIG. 7.

In the state described above, the roll paper K2 is inserted from the second opening 4 and is passed below the circumferential surface of the TPH roller 15 of the recording section, after which the roll paper K2 is moved along the sharp portion 16e of the sensor base plate 16 and out via the first opening 3. If the roll paper K2 is pulled in the direction of arrow B2 in FIG. 7, it can be torn off at the sharp portion 16e. When consumption of the roll paper K2 advances, the outer diameter of the roll approaches the diameter of the core KT and the paper may curl up. In the prior art, this can cause the roll paper K2 to penetrate into the recording section again from the second opening 4 after recording. With the arrangement of this embodiment, however, this can be prevented since the opening is closed off by the cover 45.

When the roll paper K2 is to be replaced, the cover 45 is opened to the position indicated by the two-dot chain line, after which the old roller paper K2 and core KT are removed and replaced.

Figure 8A:
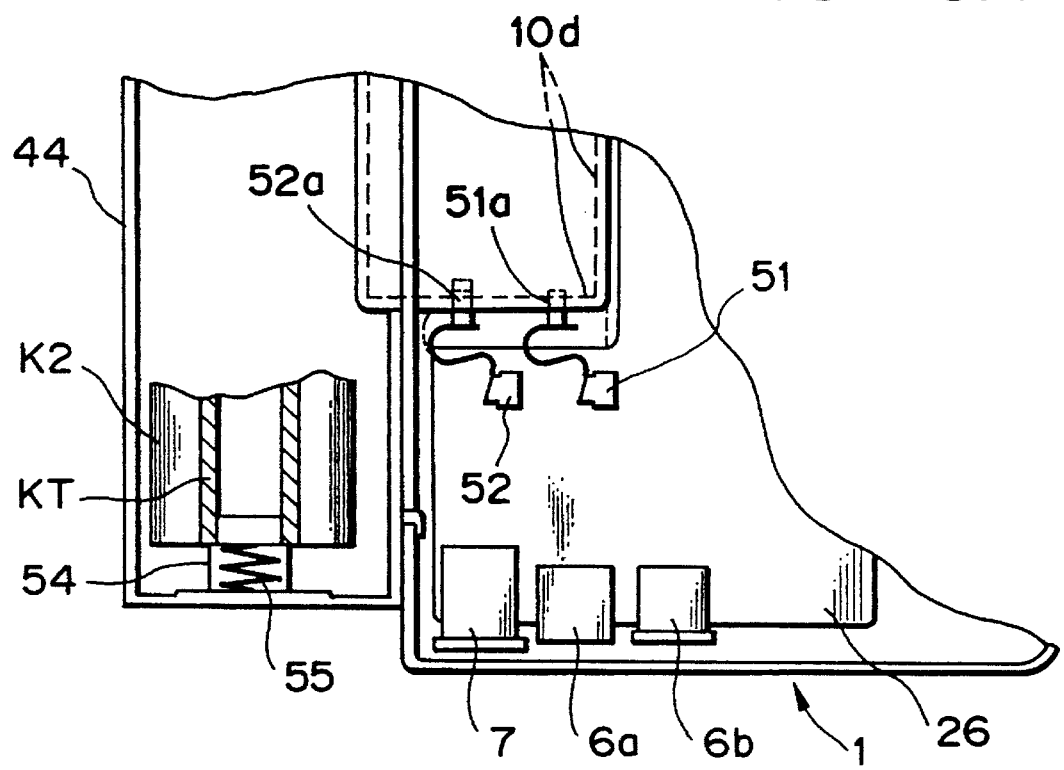
FIG. 8A is a sectional view, partially broken away, showing the slender facsimile apparatus after being combined with the roll-sheet holder.
Figure 8B:
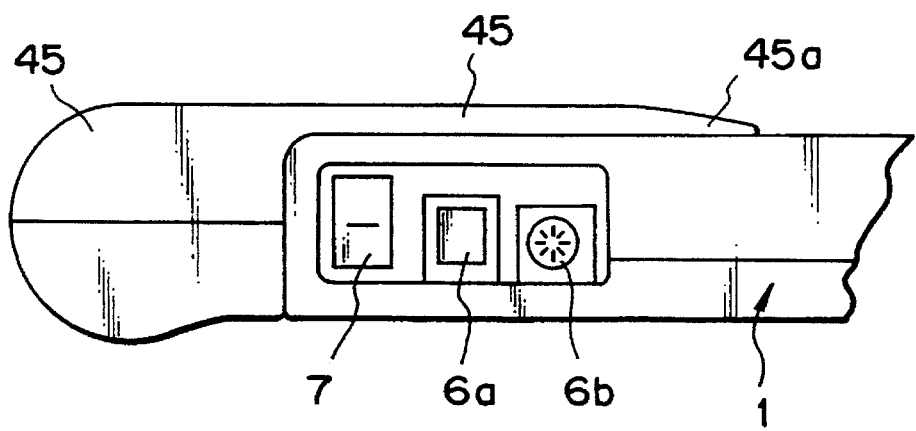
FIG. 8B is a side view showing the slender facsimile apparatus after being combined with the roll-sheet holder.

FIG. 8A is a partially enlarged plan view of the facsimile apparatus 1, and FIG. 8B is a side view of the same. These diagrams show the manner in which the facsimile apparatus 1 and roll-sheet holder 40 are combined. First, in FIG. 8A, the side face of the base portion 44 of holder 40 is provided with a guide shaft 54 that receives the compression force of a coil spring 55 so as to be fitted into a small-diameter through-hole of the core KT of roll paper K2. The roll paper K2 is axially supported in a freely rotatable and exchangeable manner between this guide shaft 54 and a guide shaft (which may be fixed) provided on the other side of the base portion 44.

A switch 7 and connectors 6a, 6b are mounted on the discrete substrate 26, and battery contacts 51, 52 are mounted on the outside of the battery receptacle 10d. Contacts 51a, 52a are projectively provided and held in a biased state by the resiliency of the material of which they are formed. By being mounted in this manner, the switch 7 and connectors 6a, 6b project to the outside, as shown in FIG. 8B. If the chargeable battery 11 is set in the main body in the direction mentioned above, it can be connected so as to supply electric power.

FIG. 9 is a partial plan view showing the facsimile apparatus 1 and the roll-sheet holder 40 after being combined. This shows the manner in which roll paper K2 of different sizes is mounted on the base portion 44 of the roll-sheet holder 40, as well as the positional relationship of the alignment roller 41. As shown in FIG. 9, roll paper K2 of size A4 (width), indicated by the dashed line, and roll paper K2 of size B4 (width), indicated by the two-dot chain line, are capable of being mounted on the base portion of the roll-sheet holder 40. In order to make the center lines C of the two sizes coincide, spacers 53 having approximately the same overall length are set on the left and right guide shafts 54. Thus, the center lines of roll paper K2 having difference sizes are made to coincide so that the center-line position relative to the alignment roller 41 will not change. This prevents meandering and skewing of the different roll papers K2.

Figure 10:
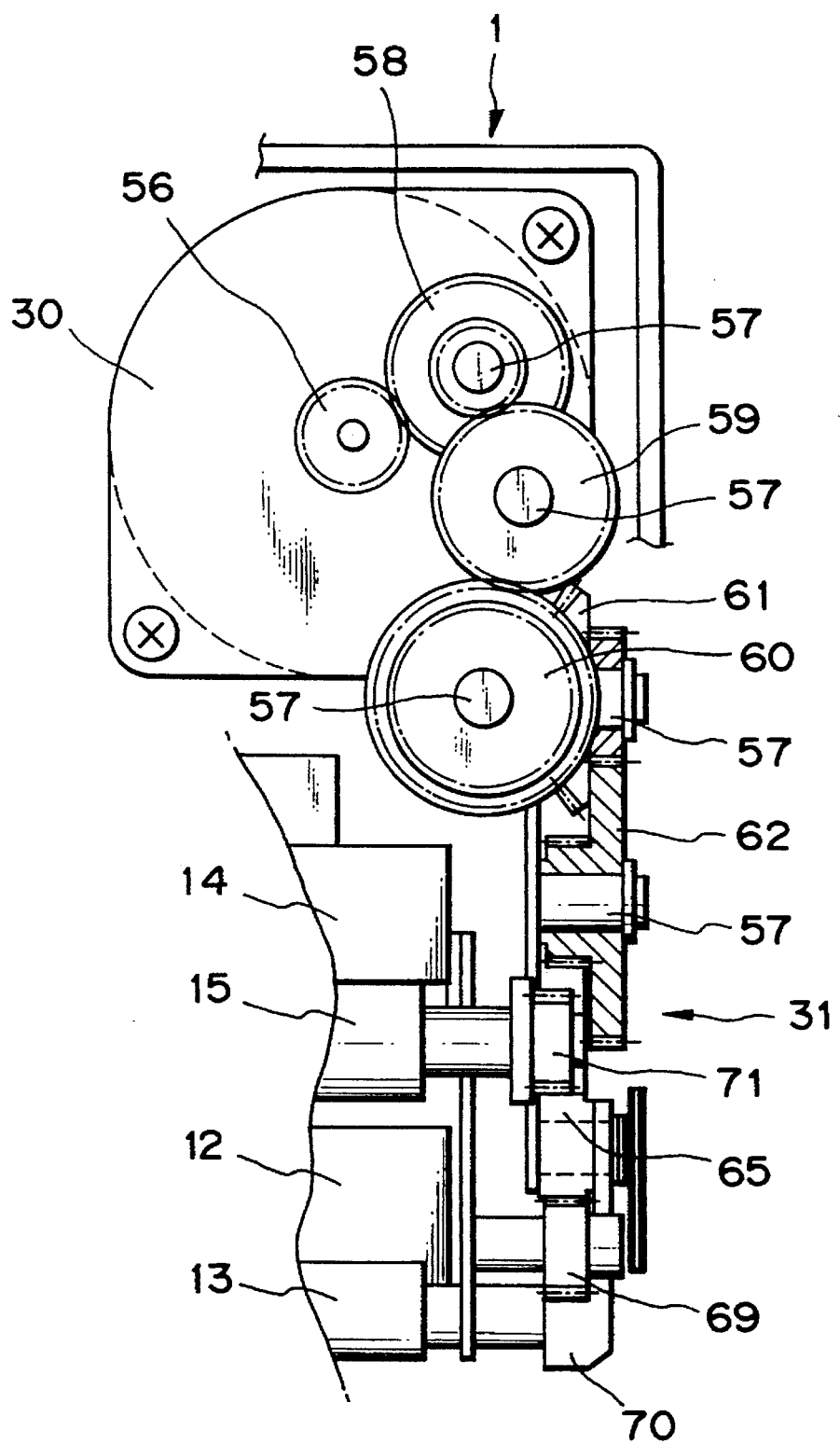
FIG. 10 is a partially enlarged plan view showing the construction of the drive mechanism of rollers.

FIG. 10 is a partially enlarged plan view showing the construction of the drive mechanism of the rollers. As shown in FIG. 10, the pulse motor 30 serving as drive means is reversible, as well known, and is provided with an output-shaft output gear 56 so as to substantially perpendicularly intersect the thickness direction of the main body of the facsimile apparatus. A first gear 58 freely rotatably supported by a stud 57 meshes with the output gear 56 and with a second gear 59. The second gear 59 meshes with a transverse bevel gear 60 so that the power from the output gear 56 is transmitted transversely (in the horizontal direction of the apparatus). A longitudinal bevel gear 61, which is freely rotatably supported in the longitudinal direction (in the vertical direction of the apparatus) by a stud 57, meshes with the transverse bevel gear 60. Thus, the output direction of the drive means is capable of being changed.

Figure 11:
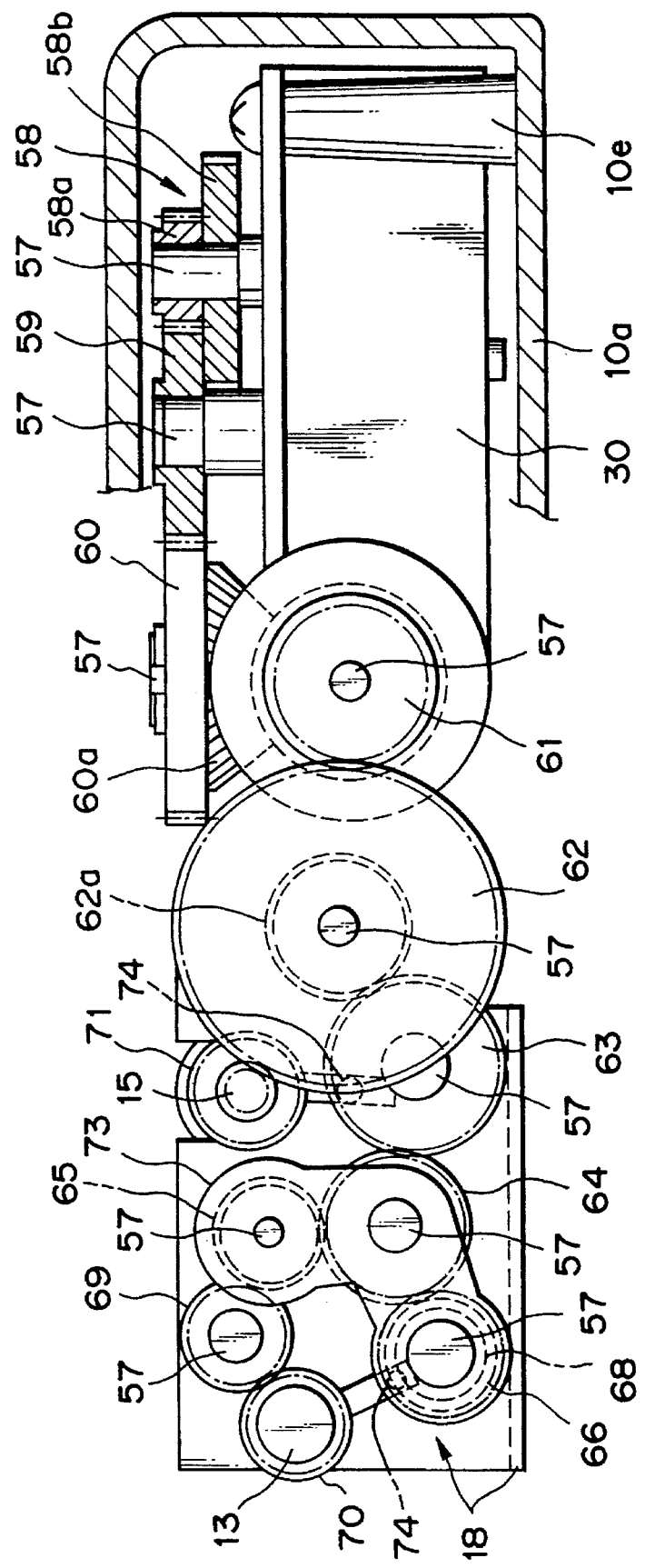
FIG. 11 is a partially enlarged plan view showing the construction of the drive mechanism of rollers.

FIG. 11 is a partially enlarged plan view showing the construction of the drive mechanism of the rollers of FIG. 10. A third gear 62 freely rotatably supported by a stud 57 meshes with the longitudinal bevel gear 61. A fourth gear 63, which is freely rotatably supported by a stud 57, meshes with the third gear 62.

A rocking mechanism is provided in the power transmission mechanism constructed as set forth above. When the pulse motor 30 rotates in one direction, the rocking mechanism places only the CS roller 13, which is the first biasing roller, in a state in which it is driven in a fixed direction. When the pulse motor 30 is rotated in the opposite direction, the rocking mechanism drives both the CS roller 13 and the TPH roller 15, which is the second biasing roller, in a fixed direction. The rocking mechanism includes a sun gear 64 that meshes with the fourth gear 63 at all times. The sun gear 64 is freely rotatably supported together with a bracket 73 by a depending stud 57 at the side face of the metal base plate 19. The bracket 73 is provided with two studs 57 supporting respective ones of a first planetary gear 65 and a second planetary gear 66 meshing with the sun gear 64. A wave washer 68 indicated by the dashed line is interposed between the second planetary gear 66 and the bracket 73. Thus, it is possible to produce a turning force that turns the bracket 73 in the clockwise direction.

A TPH roller gear 71 is secured to one end of the roller 15, and a CS roller gear 70 is secured to one end of the CS roller 13. An intermediate gear 69, which is rotatably supported by a depending stud 57 at the side face of the metal base plate 18, meshes with the CS roller gear 70 at all times. Thus, the directions in which the rollers rotate can be made the same in the meshed state after the rocking operation of the rocking mechanism.

Figure 12A:
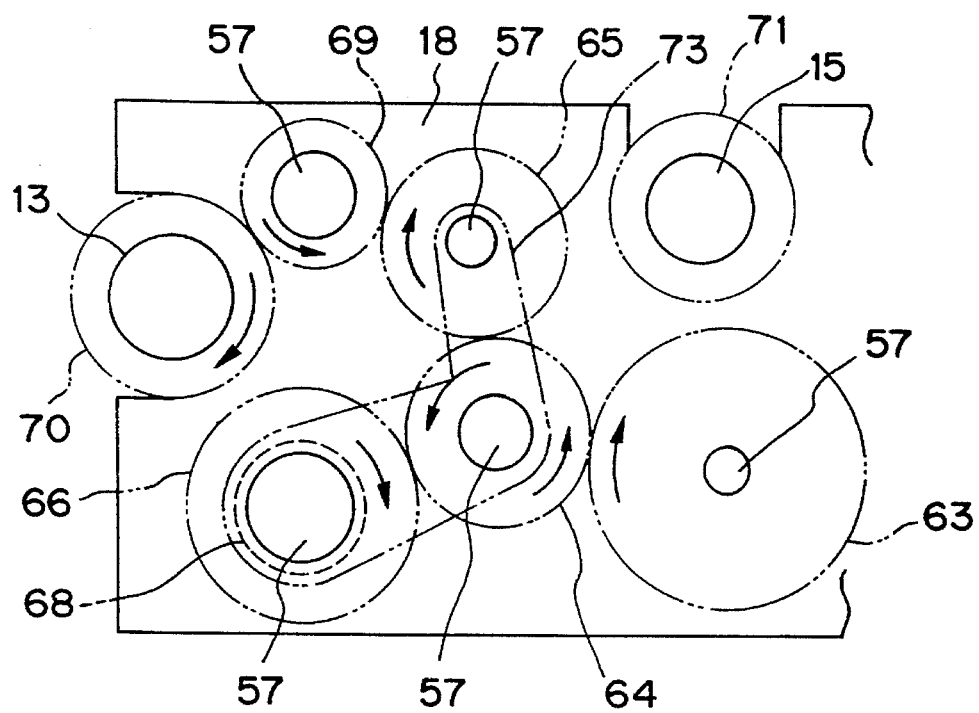
FIG. 12A is a diagram for describing the operation of a rocking mechanism in a case where a pulse motor is driven in a forward direction.
Figure 12B:
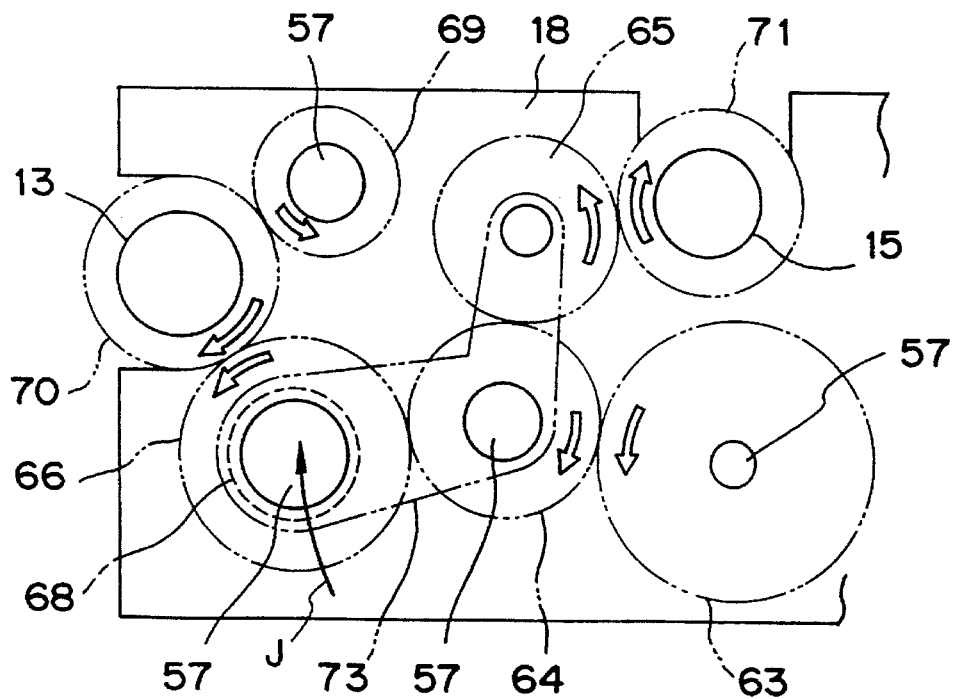
FIG. 12B is a diagram for describing the operation of a rocking mechanism in a case where a pulse motor is driven in a reverse direction.

The power transmission and the rocking mechanism will now be described based upon FIGS. 12A and 12B, which illustrate operation. FIG. 12A is a side view illustrating a case where the pulse motor is driven in the forward direction, and FIG. 12B is a side view illustrating a case where the pulse motor is driven in the reverse direction. The pitch circle diameter of each gear is represented by a one-dot chain line.

As shown in FIG. 12A, the fourth gear 63 is driven in the direction of the arrow so that the sun gear 64 meshing therewith is driven in the direction indicated by the arrows. As a result, though the planetary gears 65, 66 axially supported by the bracket 73 also turn, the bracket 73 develops a turning force in the counter-clockwise direction owing to the action of the aforementioned wave plate 68, whereby the first planetary gear 65 is brought into mesh with the intermediate gear 69.

Next, in FIG. 12B, the fourth gear 63 is driven in the direction of the bold arrow, and therefore the sun gear 64 meshing with the gear 63 is driven in the direction of the bold arrow. As a result, though the planetary gears 65, 66 axially supported by the bracket 73 also turn, the bracket 73 develops a turning force in the clockwise direction owing to the action of the aforementioned wave plate 68, whereby the first planetary gear 65 is disengaged from the intermediate gear 69 and meshed with the TPH roller gear 71. Further, the second planetary gear 66 meshes with the CS roller gear 70 from its lower side so that the CS roller gear 70 is placed in a state in which it is driven in the direction of the bold arrow.

As a result of the foregoing operation, the biasing rollers can be driven selectively merely by changing the direction in which the single pulse motor 30 is driven. This makes it possible to reduce power consumption as well as cost by reducing the number of component parts.

Figure 13:
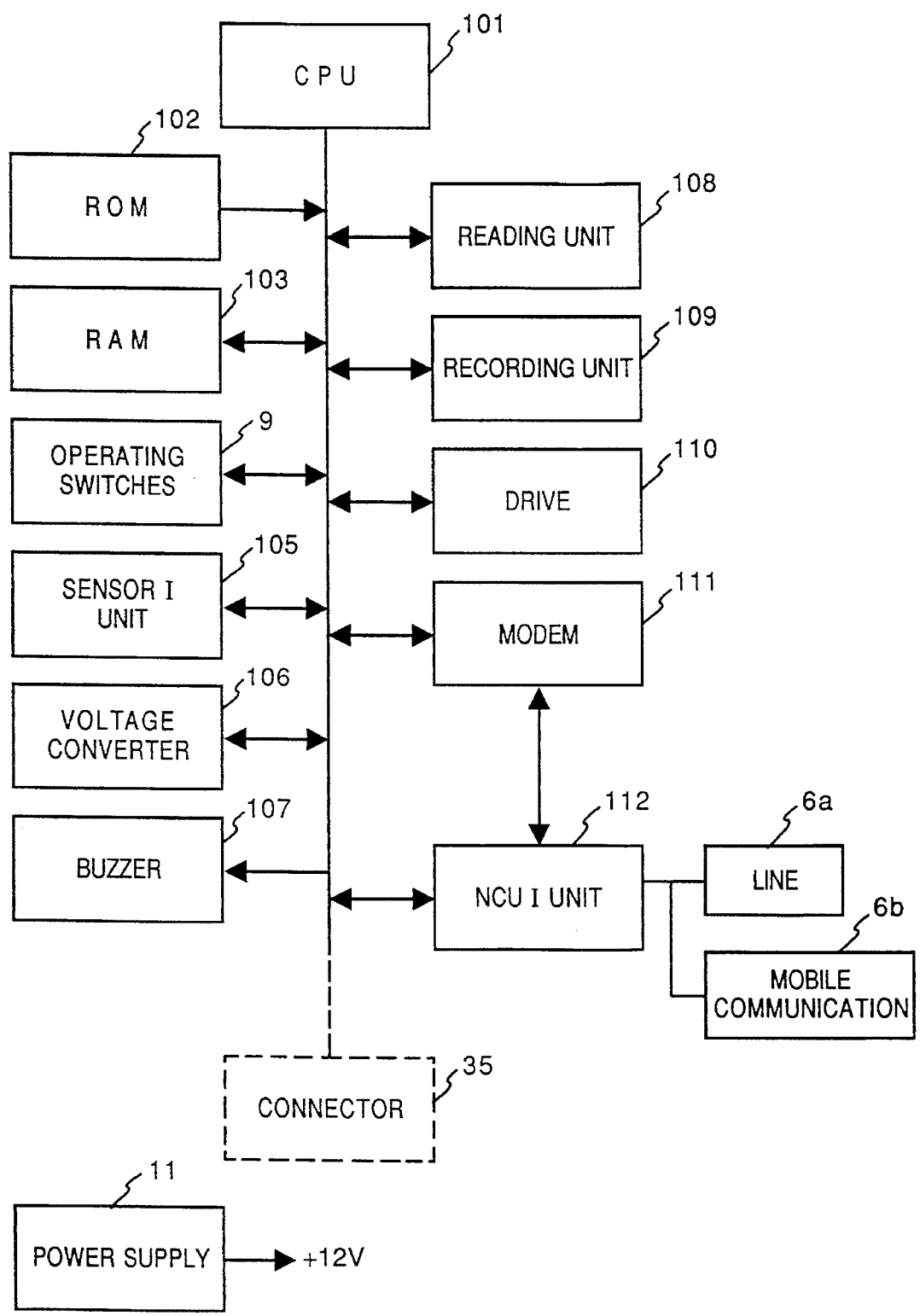
FIG. 13 is block diagram showing a facsimile apparatus according to another embodiment.

FIG. 13 is a block diagram illustrating the facsimile apparatus. As shown in FIG. 13, various components are connected to a CPU 101. These components are a ROM 102, a RAM 103, the operating switches 9, a sensor unit 105 comprising the DES sensor 22 and the RPS sensor 24, a voltage converter 106 for obtaining a voltage of 5 V from a power-supply voltage (12 V) provided by the chargeable battery (power source) 11, a buzzer 107 for informing the user of operating status, a reading unit 108 for processing a read signal from the contact sensor 12, a recording unit 109 for outputting a recording signal produced by the line thermal head 14, a drive unit 110 for driving the pulse motor in the prescribed manner, a MODEM 111 for converting the line signal, and an NCU I UNIT 112 connected to the connector 6a, which is for connection to the telephone line, or to the connector 6b, which is for a mobile telephone. A connecting unit 35 indicated by the dashed line is a connector for external connection in a case where the apparatus 1 is provided with additional functions. This 5 unit is provided on the connector board 27 mentioned earlier.

In the arrangement set forth above, there is a receiving mode, a transmitting mode and a copy mode, the operations of which will be described with reference to the flowcharts of FIGS. 14 and 15.

Figure 14:
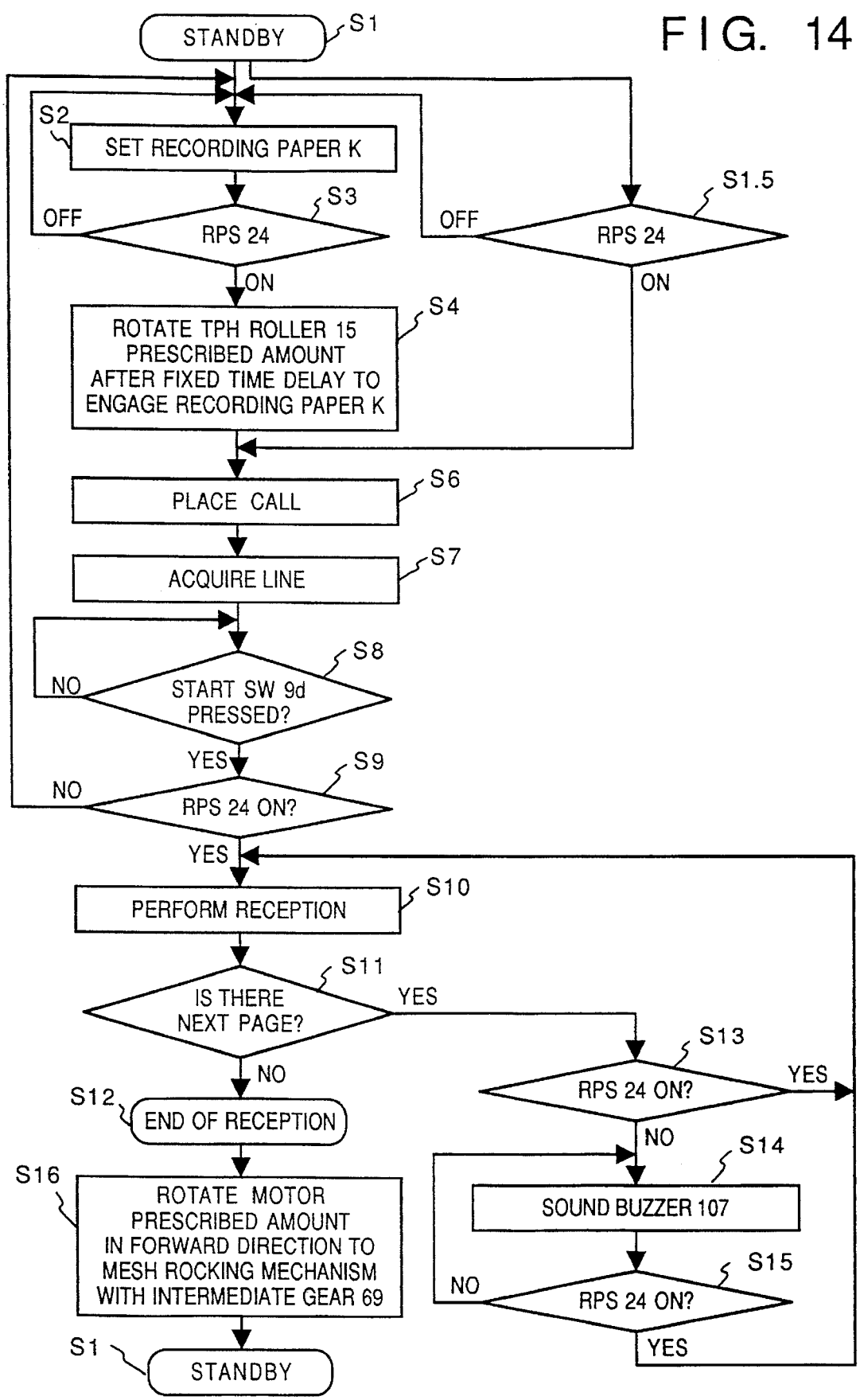
FIG. 14 is a flowchart of a receiving mode.
Figure 15:
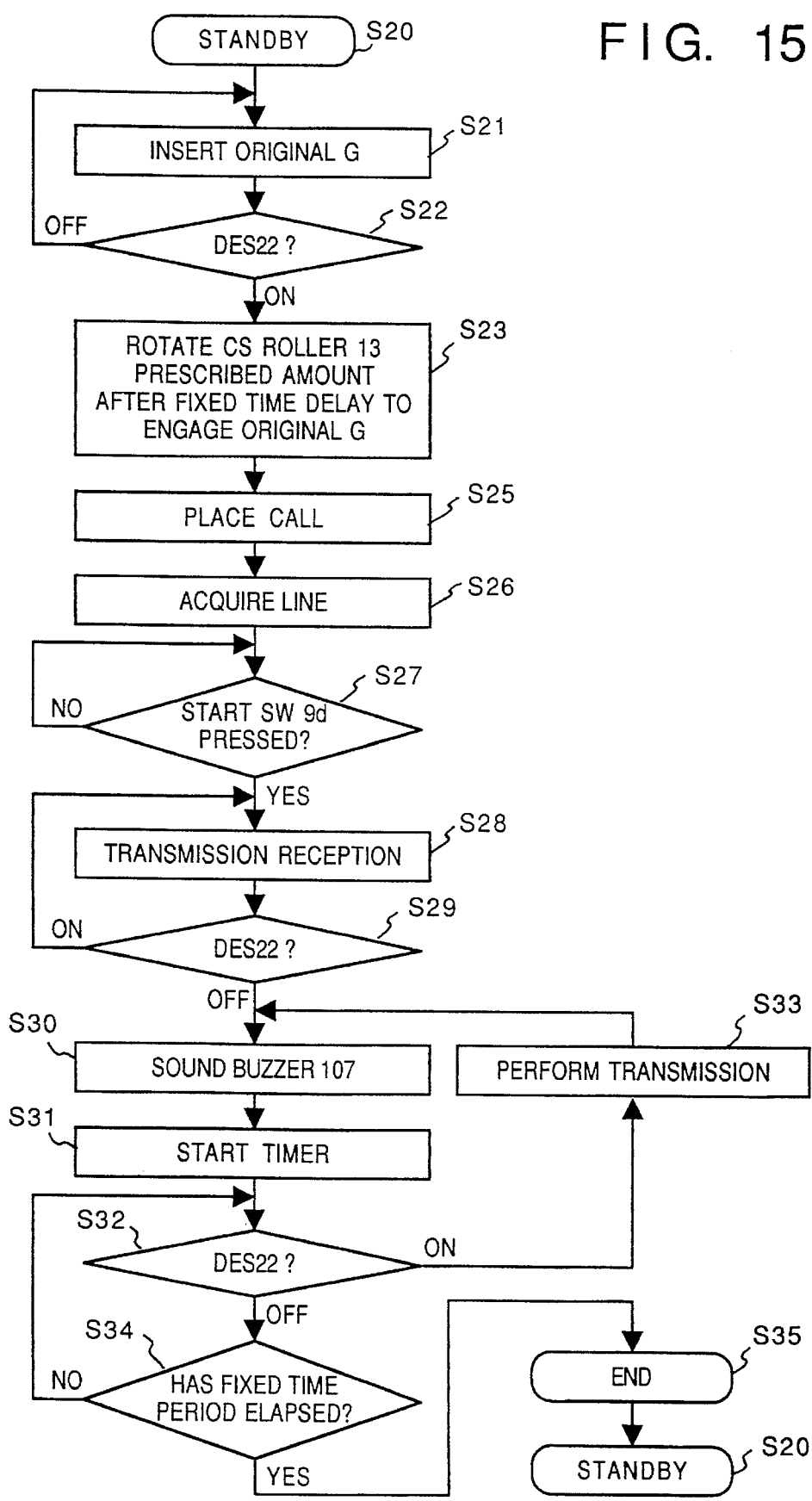
FIG. 15 is a flowchart of a transmitting mode.

In the receiving mode, processing proceeds to a step S1.5 in FIG. 14 from a standby state at step S1. Here whether or not the recording paper K is present is sensed by the RPS sensor 24. Processing proceeds to step S6 (described below) if the sensor is ON and to step S2 if the sensor is OFF. The recording paper K (the pre-cut sheet K1 or the roll paper K2) is set at step S2.

Step S2 is followed by step S3, at which the RPS sensor 24 senses whether or not the recording paper K is present. If the sensor is ON, then the program proceeds to step S4. Here, upon elapse of a prescribed period of time, the TPH roller 15 is rotated a fixed amount to bring the leading edge of the recording paper K into abutting contact with the line thermal head 14, whereby skewing of the recording paper K is eliminated. The recording paper K is then placed in a state in which it can be taken into the recording section to enable recording. A call is placed to the transmitting side at step S6, after which a line is acquired at step S7 and the start switch 9d is pressed at step S8. The program then proceeds to step S9, at which the RPS sensor 24 senses whether or not the recording paper K is present. If the sensor is ON, the apparatus makes a transition to a receiving operation at step S10. When the recording operation is completed, the program proceeds to step S11, at which it is determined from the transmitting side whether the next page is present. If the decision rendered is NO, the receiving operation is completed (step S12).

If the next page from the transmitting side is present, the program proceeds to step S13, at which the apparatus waits for the setting of the second sheet of recording paper K. Whether or not the recording paper K is present is sensed by the RPS sensor 24. If the sensor is ON, the program proceeds to step S10 and the receiving operation is executed. If the RPS sensor 24 does not attain the ON state even upon elapsed of a prescribed period of time, then the program proceeds to step S14, at which the buzzer 107 is actuated to prompt the user to set the recording paper in place. Next, when the recording paper K is set and the RPS sensor 24 attains the ON state at step S15, the program proceeds to step S10 and the receiving operation is executed. An operation similar to the foregoing is repeatedly executed to receive the prescribed number of pages.

When reception of the prescribed number of page ends, the program proceeds to step S16, at which the pulse motor 30 is driven in the forward direction. As a result, as shown in FIG. 12A, the first planetary gear 65 is meshed with the intermediate gear 69 and the TPH roller gear 71 is separated from the first planetary gear 65. Next, the program proceeds to step S1, at which the standby state is attained again.

Operation in the transmitting mode will now be described with reference to the flowchart of FIG. 15.

In the transmitting mode, processing proceeds to a step S21 from the standby state at step S20. The original G is set in place at step S21. Next, the program proceeds to step S22, at which the DES sensor 22 senses whether or not the original G is present. Processing proceeds to step S23 if the sensor 22 is ON. Here, upon elapse of a prescribed period of time, the CS roller 13 is rotated a fixed amount to bring the leading edge of the original G into abutting contact with the contact sensor 12, whereby skewing of the original G is eliminated and calibration is performed. The original G is then placed in a state in which it can be taken into the reading section to enable reading. A call is placed to the transmitting side at step S25, after which a line is acquired at step S26 and the start switch 9d is pressed at step S27. The program then proceeds to step S28, where a transition is made to the transmitting operation. Whether or not the trailing edge of the original G is present is determined at step S29. If the trailing edge is absent, the program proceeds to step 30, at which the buzzer 107 is actuated to prompt the user to set the next original G in place. This is followed by step S31, at which an internal timer is started, and then by step S32. When the DES sensor 22 attains the ON state, the program proceeds to step S33, at which the transmitting operation is executed. If the DES sensor 22 remains in the OFF state for a fixed period of time at step S32, then it is judged that there is no next original and operation is concluded at step S35. The apparatus then returns to the standby state of step S20.

Figure 16:
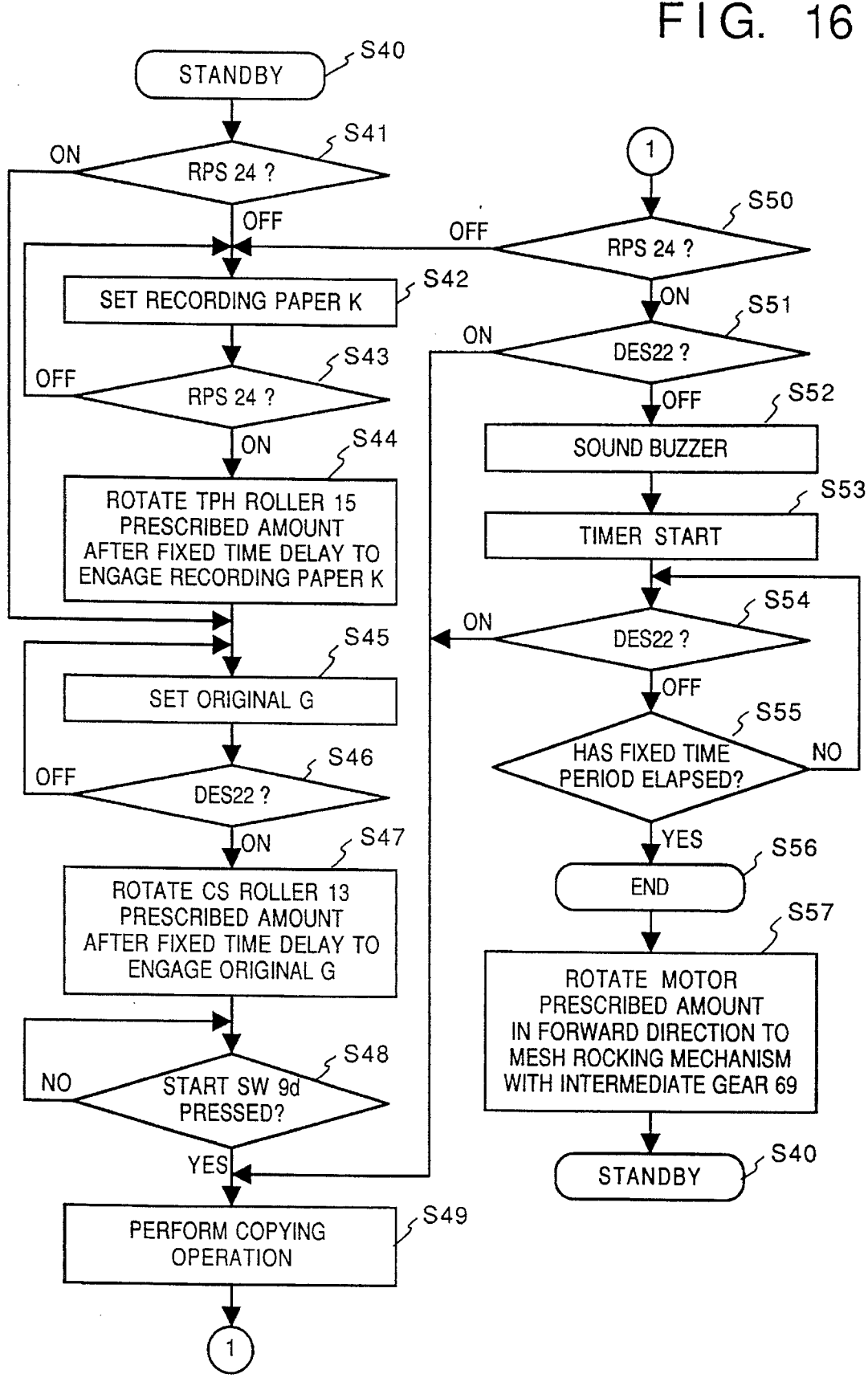
FIG. 16 is a flowchart of a copy mode.

Operation in the copy mode will now be described with reference to the flowchart of FIG. 16.

In the copy mode, processing proceeds to a step S41 from the standby state at step S40. Here whether or not the recording paper K is present is sensed by the RPS sensor 24. Processing proceeds to step S45 (described below) if the sensor 24 is ON and to step S42 if the sensor 24 is OFF. The recording paper K (the pre-cut sheet K1 or the roll paper K2) is set at step S42.

Step S42 is followed by step S43, at which the RPS sensor 24 senses whether or not the recording paper K is present. If the sensor is ON, then the program proceeds to step S44. In order to prevent skewing of the recording paper K, the TPH roller 15 is rotated a fixed amount upon elapse of a prescribed period of time. Thus, the recording paper K is taken into the recording section to enable recording.

The program then proceeds to step S48, at which the apparatus waits for the copy switch 9b to be pressed, and then to step S49, at which a transition is made to the copying operation. During the copying operation, the RPS sensor 24 senses whether or not the recording paper K is present at step S50. The program returns to step S42 when there is no longer any recording paper K. If the RPS sensor 24 is ON, then the program proceeds to step S51, at which whether the original G is present or not is sensed. If the DES sensor 22 is ON, then the program returns to step S49 and the copying operation continues. When the reading of the original G ends and the DES sensor 22 turns OFF, the program proceeds to step S52, where the buzzer 107 is sounded to prompt the user to set the next original in place.

Next, the program proceeds to step S53, at which an internal timer is started, and then to step S54. When the DES sensor 22 attains the ON state, the program proceeds to step S49, at which the copying operation is executed again. If the DES sensor 22 remains in the OFF state for a fixed period of time at step S54, then it is judged that there is no next original and the copying operation is concluded at step S56. When the copying operation ends, the program proceeds to step S57, at which pulse motor 30 is driven in the forward direction. As a result, as shown in FIG. 12A, the first planetary gear 65 is meshed with the intermediate gear 69 and the TPH roller gear 71 is separated from the first planetary gear 65. Next, the program proceeds to step S40, at which the standby state is attained again.

Operation when the stop switch 9c is pressed and operation when the power-supply switch 7 is switched from the OFF state to the ON state will now be described with reference to the flowcharts of FIGS. 17 and 18.

Figure 17:
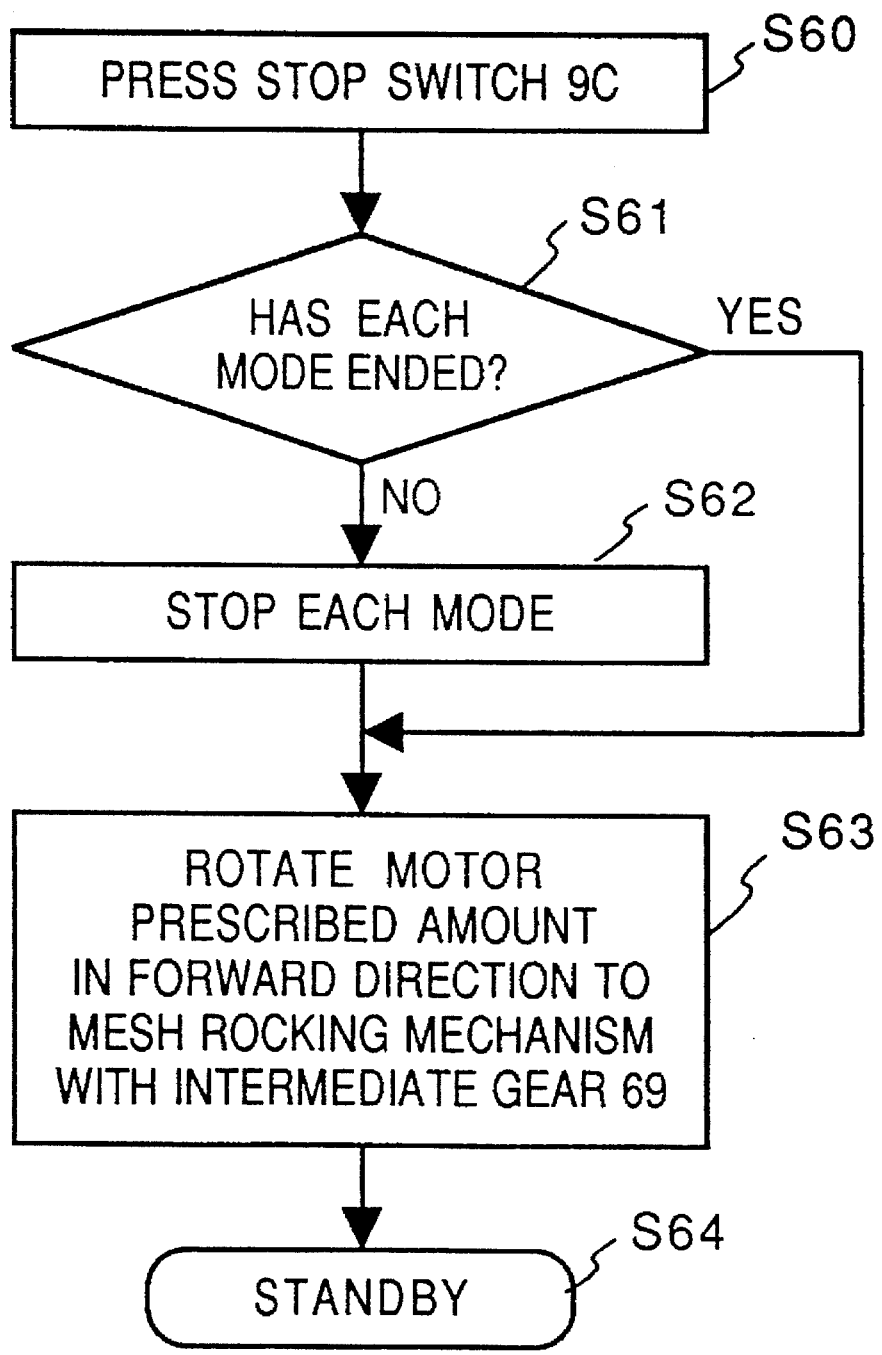
FIG. 17 is a flowchart of a stop-switch operating mode.
Figure 18:
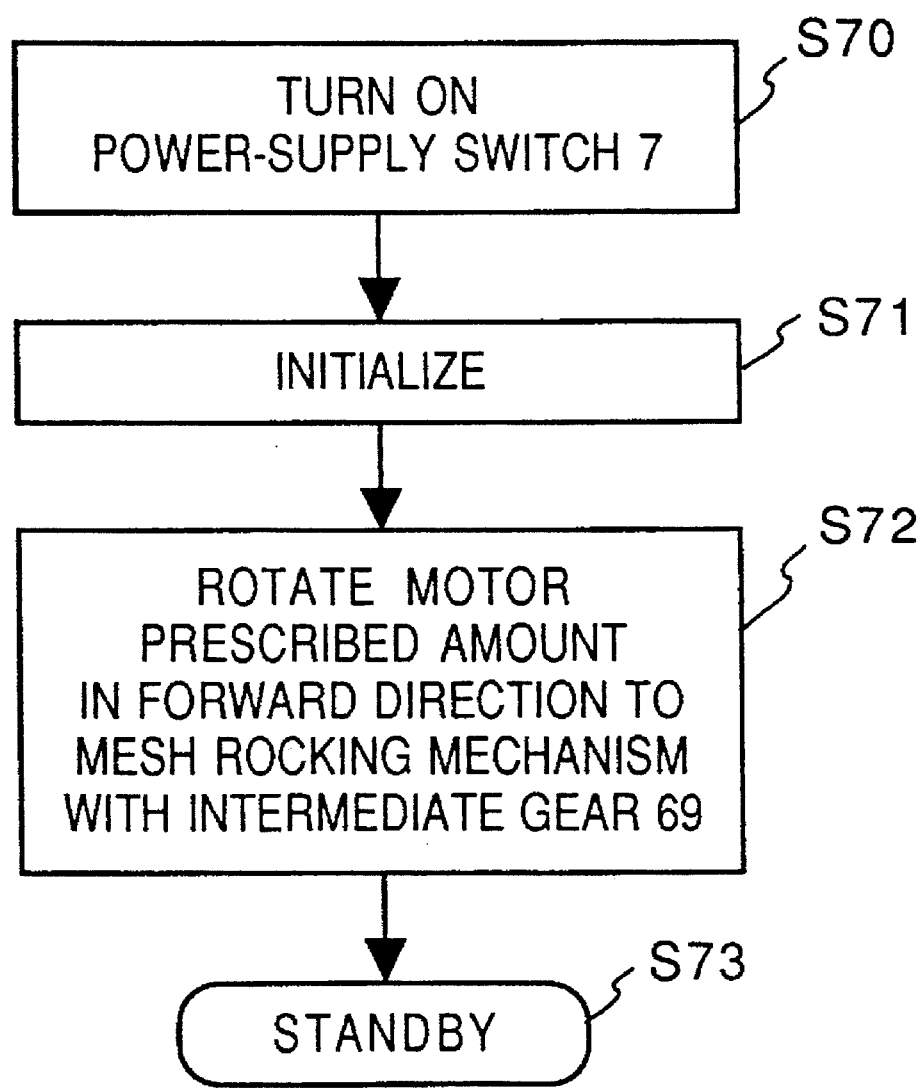
FIG. 18 is a flowchart of a power-supply switch operating mode.

When the stop switch 9c is pressed at step S60 in FIG. 17, the program proceeds to step S61, at which it is determined whether operation in each mode, such as the transmitting mode and receiving mode, has ended. If operation in each mode has not ended, then the program proceeds to step S62, at which operation in each mode is stopped to terminate operation. When operation in each mode is concluded, the program proceeds to step S63, at which the pulse motor 30 is driven in the forward direction. As a result, as shown in FIG. 12A, the first planetary gear 65 is meshed with the intermediate gear 69 and the TPH roller gear 71 is separated from the first planetary gear 65. Next, the program proceeds to step S64, at which the standby state is attained.

Operation when the power-supply switch is turned ON will now be described with reference to the flowchart of FIG. 18.

When the power-supply switch 7 is turned ON at step S70, the program proceeds to step S71, at which initialization is performed. Next, the program proceeds to step S72, at which the pulse motor 30 is driven in the forward direction. As a result, as shown in FIG. 12A, the first planetary gear 65 is meshed with the intermediate gear 69 and the TPH roller gear 71 is separated from the first planetary gear 65. Next, the program proceeds to step S73, at which the standby state is attained.

Thus, according to the embodiment described above, the TPH roller gear 71 is separated from the first planetary gear 65 and taken out of mesh with the power transmission mechanism after the end of each operation, such as the receiving operation, transmitting operation and copying operation, after the stop switch 9c is pressed and after the power-supply switch 7 is turned ON (when the transmitting mode is in effect). As a result, the frictional load upon the TPH roller 15 is eliminated to place the TPH roller 15 in the free state.

According to the foregoing embodiment, if jamming occurs for some reason during the recording operation, or if the roll-sheet holder 40 is detached from the facsimile apparatus, it is necessary to pull the recording paper K1 out of the facsimile apparatus 1. However, since the TPH roller 15 is made free to rotate at the end of each operation, as described above, it is possible to pull the recording paper K in the direction of conveyance or in the direction opposite thereto. Further, if the power supply is turned OFF during the recording operation, turning the power supply ON again will make it possible to pull the recording paper K1.

The CS roller 13, on the other hand, is not free to turn since the CS roller gear 70 is meshing with the intermediate gear 69 and the intermediate gear 69 is meshing with the first planetary gear 65. However, in a case where the original G is pulled out of the facsimile apparatus 1, pulling the original G in the direction of conveyance makes it possible to pull out the original with ease. This will be described with reference to FIGS. 19A and 19B.

Figures 19A, 19B:
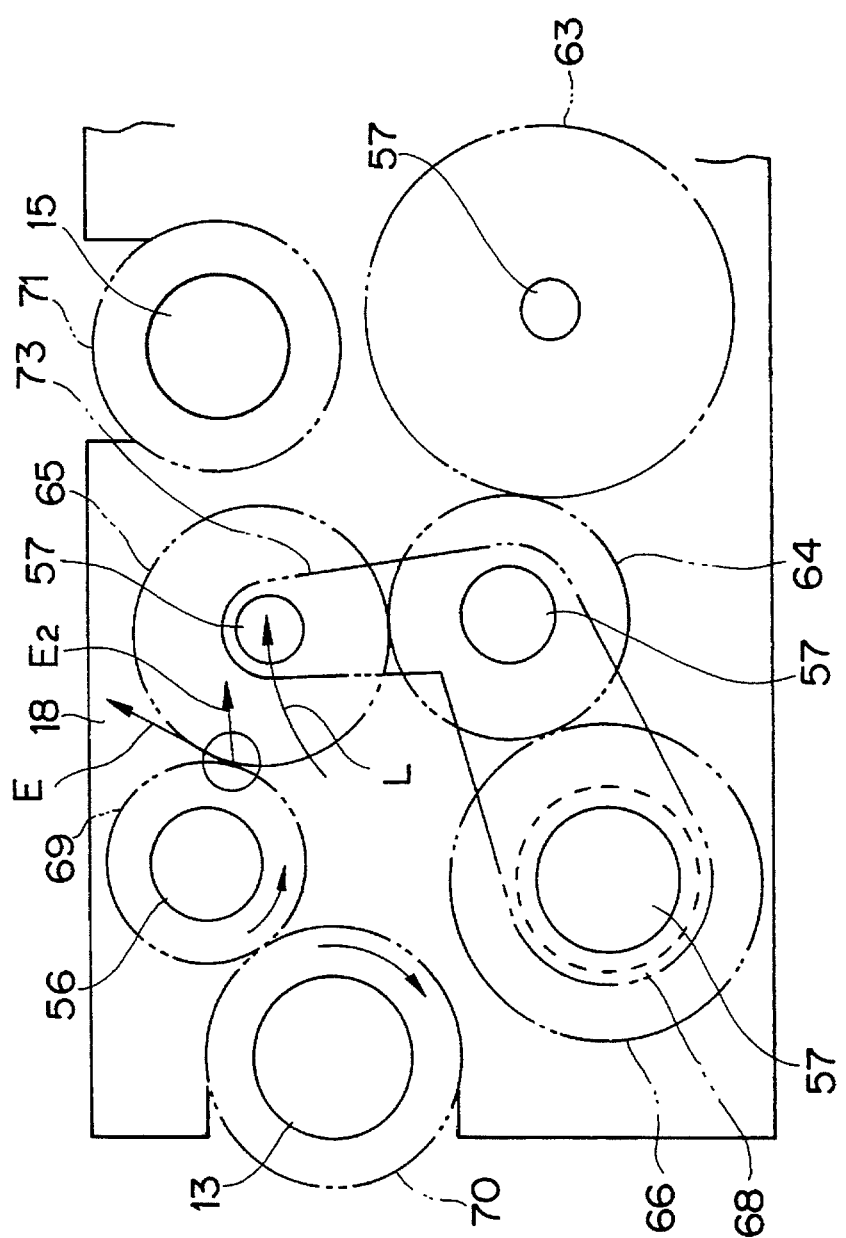
FIG. 19A is a diagram for describing a rocking mechanism in a case where an original is pulled out in the conveyance direction.
FIG. 19B is a partially enlarged view of FIG. 19A.

First, in FIG. 19A, pulling the original G in the direction of conveyance causes the CS roller 13 to turn so that the CS roller gear 70 and intermediate gear 69 are rotated in the directions indicated by the arrows. As a result, since the intermediate gear 69 has a component that urges the first planetary gear 65 in the direction of arrow E2, as indicated in FIG. 19 showing the meshing engagement between the intermediate gear 69 and the first planetary gear 65 in enlarged form, the rocking mechanism is moved in the direction of arrow L so that the first planetary gear 65 attempts to separate from the intermediate gear 65. Consequently, the CS roller 13 is made free to rotate so that the original G can be pulled with ease.

However, in a case where the original G is pulled in the direction opposite the direction of conveyance, the rocking mechanism attempts to move in the direction opposite that of the arrow L and the CS roller 13 can no longer turn. However, by making the biasing force of the CS roller 13 small but to a degree that will still enable the original G to be conveyed, it will be possible to pull out the original G while it slides on the CS roller 13. In other words, according to the illustrated embodiment, an arrangement is adopted in which there is no automatic feeding device for the original G and the path of the original G is approximately linear. Therefore, since the load with respect to conveyance of the original G is small, only a small force will be needed to convey the original G and, hence, the biasing force of the CS roller 13 can be made small.

In this embodiment, the arrangement is such that the rocking mechanism is engaged on the side of the CS roller 13. However, if it is arranged so that the rocking mechanism is not engaged on the side of the CS roller 13 nor on the side of the TPH roller 15, i.e., so that the first planetary gear 65 is held midway between the intermediate gear 69 and the TPH gear 71, then the original can readily be pulled out in the direction opposite the conveyance direction.

However, a mechanism for holding the rocking mechanism midway between the intermediate gear 69 and the TPH gear 71 is necessary. In view of the requirements of the portable facsimile apparatus, namely that the apparatus is carried about, the holding mechanism must be designed in such a manner that the rocking mechanism will not be moved by an external force such as vibration. Since this will lead to a larger and more complicated holding mechanism, the effect will be counter to one of the objects of the invention, namely a reduction in the size of the facsimile apparatus. In conclusion, therefore, the arrangement described above is best.

As a result of the operation described above, the rocking mechanism is meshed on the side of the CS roller and the TPH roller is freed for rotation after each operation, after the stop switch is pressed and after the power-supply switch is turned ON. As a result, it is unnecessary to separately provide a mechanism for releasing the biasing forces of the CS roller and TPH roller and it is easy to pull out the original as well as the recording paper. As a result, the biasing rollers can be driven selectively merely by changing the direction in which the single pulse motor 30 is driven. This makes it possible to reduce power consumption as well as cost by reducing the number of component parts.

In accordance with the present invention, as described above, there can be provided a facsimile apparatus capable of being made small in size and light in weight, and in which an original or a sheet of recording paper can readily be pulled out of a recording section or reading section at will.

Figure 20A:
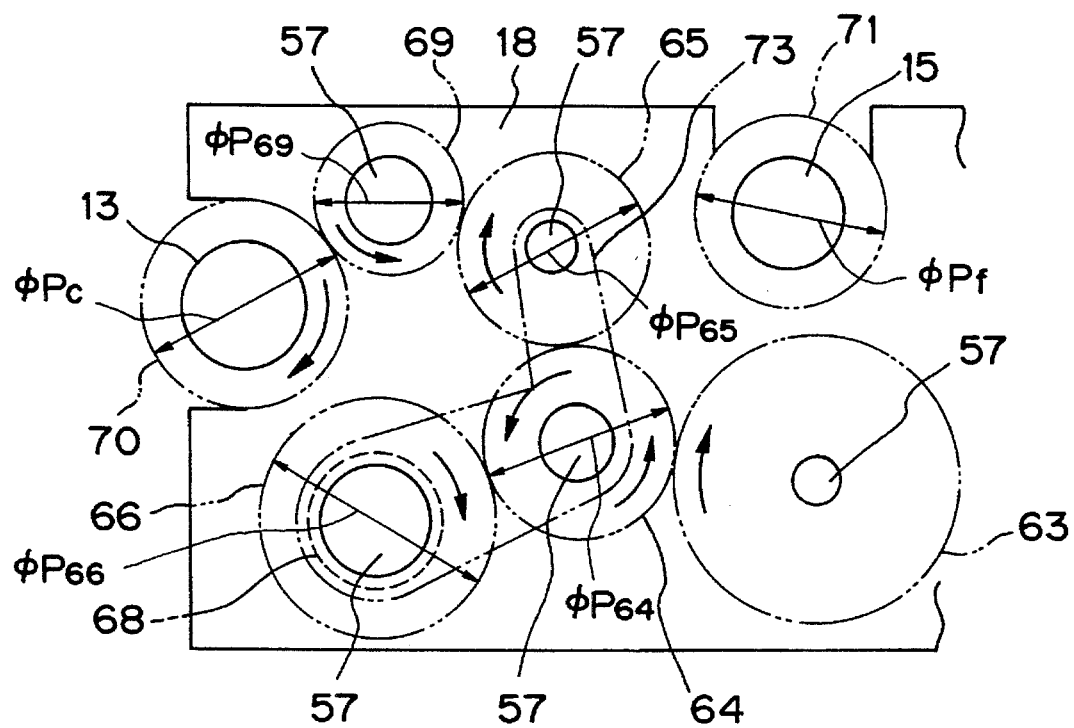
FIG. 20A is a diagram for describing the operation of a rocking mechanism in a case where a pulse motor is driven in the forward direction.
Figure 20B:
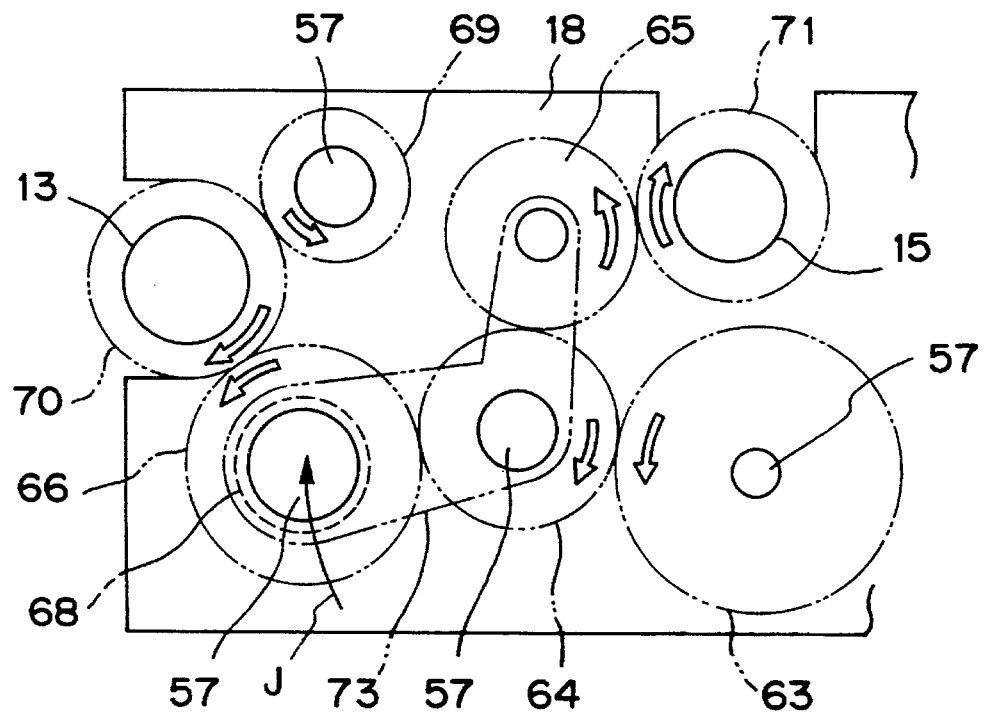
FIG. 20B is a diagram for describing the operation of a rocking mechanism in a case where a pulse motor is driven in the reverse direction.
Figure 22:
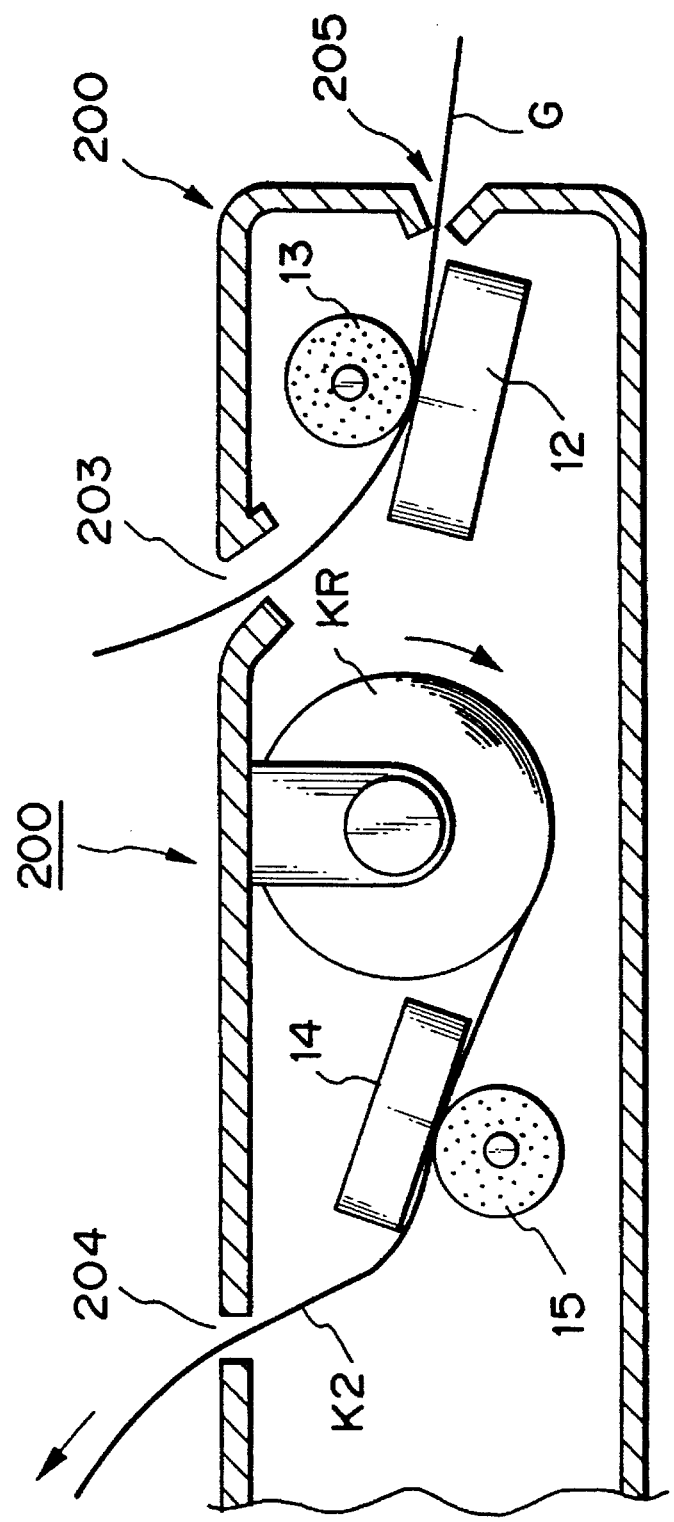
FIG. 22 is a transverse sectional view showing a facsimile apparatus according to the prior art.

As set forth above, the rocking mechanism rotates the CS roller gear 70 via the intermediate gear 69 in a case where the pulse motor is driven in the forward direction (FIG. 20A), and the rocking mechanism rotates the CS roller gear 70 directly in a case where the pulse motor is rotated in the reverse direction (FIG. 20B). As a result, the CS roller can be rotated in the same direction irrespective of the direction in which the pulse motor is rotated.

If the intermediate gear 69 is dispensed with and the pulse motor is driven in the forward direction, it is possible to realize a structure in which the rocking mechanism rotates the CS roller gear 70 directly. In such case, however, the original will advance in one direction when the original is transmitted and in a different direction when it is copied. This results in a bothersome operation in which the user must insert the original in different directions depending upon whether the original is to be transmitted or copied.

Further, as mentioned above, the pulse motor is rotated in the forward direction at the time of transmission, whereby only the CS roller 13 is driven. At the time of reception and copying, the pulse motor is rotated in the reverse direction, whereby the CS roller 13 and TPH roller 15 both are driven simultaneously. As a result, three modes, namely reception, transmission and copying, can be dealt with using a single motor. In such case, the CS roller also turns simultaneously at the time of reception and comes into direct contact with the CS without the intermediary of paper between them. Consequently, the load is greater than in the case where the paper intervenes. However, only the TPH roller is driven at the time of reception and it will suffice if the load is small in comparison with the load which prevails when the TPH roller and the TPH roller come into contact without the intermediary of paper in a case where both the CS roller and TPH roller are driven when transmission is performed and when copying is performed.

The reason for this is as follows: The biasing force of the CS roller is that required in order to prevent the original from floating. In order for the head of the TPH roller to be transmitted to the thermosensitive recording paper efficiently and to correct for some positional error in the heating element, it will suffice to make the biasing force of the CS roller small in comparison with that of the TPH roller, which must have a large nipping width.

More specifically, if rollers having the same coefficient of friction are used, the roller having the smaller biasing force will have a smaller frictional load.

Accordingly, by driving solely the CS roller at the time of transmission and both rollers at the time of reception and copying, as in the present invention, the motor can be driven at a lower torque, the motor can be made smaller in size and the power consumed can be reduced.

By contrast, when the TPH roller 15 also is rotated simultaneously at the time of transmission, not only the original but also the recording sheet is conveyed at the same time in the case where the recording paper in rolled form has been set in place. This results in wasting of the rolled recording paper.

The power transmission mechanism of the present invention will now be described in further detail.

The same power transmission mechanism is used up to the sun gear 64 and the same gear ratios are used also in a case where the CS roller or TPH roller is driven, as shown in FIGS. 21A and 21B.

Let $1/i$ represent the common gear ratio, and let $\Phi P_{64}$, $\Phi P_{65}$, $\Phi P_{66}$, $\Phi P_{69}$, $\Phi P_c$, $\Phi P_t$ represent the reference pitch circle diameters of the sun gear 64, first planetary gear 65, second planetary gear 66, intermediate gear 69, CS roller gear 70 and TPH roller gear 71, respectively. Gear ratio $i_T$ to the TPH roller at reception, gear ratio $i_{c1}$ to the CS roller at copying and gear ratio $i_{c2}$ to the CS roller at transmission satisfy the conditions shown in Equation A of FIG. 21A.

In order to satisfy the copy function in the foregoing power transmission mechanism, the conveyance speeds of the original and recording paper must be made the same because the TPH roller and CS roller are both driven at the same time by a single motor. Consequently, if we let $\Phi T$ represent the diameter of the TPH roller and $\Phi C$ the diameter of the CS roller, then Equation B in FIG. 21B will be the condition, the condition of Equation C is satisfied and the relation indicated by Equation D becomes the condition.

Further, in this embodiment, T=C and $P_T=P_C$ hold. However, as long as the foregoing condition is satisfied, it is unnecessary for T=C, $P_T=P_C$ to hold.

Thus, in a case where the three modes of transmission, reception and copying are performed by a single motor, a single, common speed reduction mechanism is used up to the rocking mechanism to realize $C/P_c=T/P_r$. As a result, the power transmission mechanism on the roller side from the rocking mechanism can be constructed from three gears, namely the intermediate gear 69, CS roller gear 70 and TPH roller gear 71. This makes it possible to obtain a more compact power transmission mechanism, reduce the number of parts, lower cost and attain a facsimile apparatus of smaller size and lighter weight.

If the condition $C/P_c=T/P_t$ is not satisfied, a speed reduction mechanism must be provided on the roller side from the rocking mechanism in order to achieve agreement between the peripheral speeds of the TPH roller and CS roller. This will increase the number of component parts.

In accordance with the present invention, as described above, there can be provided a facsimile apparatus capable of being constructed to be small in size and low in weight, in which a common driving source is employed to drive the rollers that convey the original and the recording paper. A single motor drives the three modes of transmission, reception and copying 5 without using a memory or a complicated mechanism. Thus, power consumption can be reduced and so can the number of component parts to enable a reduction in cost.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus comprising:

an original reading section having a contact-type line image sensor and a first biasing roller driven so as to be rotated in a state which said contact-type line image sensor is biased;

a recording section arranged in the vicinity of said original reading section and having a line thermal head and a second biasing roller driven so as to be rotated in a state in which said line thermal head is biased;

drive means in which a reversible motor is used as a drive source;

a rocking mechanism for driving solely said first biasing roller when the motor is rotatively driven in one direction and driving both said first and second biasing rollers when the motor is rotatively driven in the other direction; and a power transmission mechanism in which said rocking mechanism is arranged in a power transmission system for driving said first and second biasing rollers, wherein said rocking mechanism rocks so as to drive solely said first biasing roller when an original is set and when the original is transmitted, rocks so as to drive both said first and second biasing rollers when recording paper is set, when reception is performed and when a copy is made, and rocks so as to drive said first biasing roller after the recording paper is set, after reception and after copying.

2. A facsimile apparatus constructed to have a flat, compact configuration, comprising:

a base portion;

an original reading section having a contact-type line image sensor and a first biasing roller rotatably supported on said base portion so as to be rotated in a state in which said contact-type line image sensor is biased, said first biasing roller having a gear fixed thereto;

a recording section arranged in the vicinity of said original reading section and having a line thermal head and a second biasing roller rotatably supported on said base portion so as to be rotated in a state in which said line thermal head is biased, said second biasing roller having a gear fixed thereto;

drive means secured to said base portion and having a reversible motor used as a drive source;

a rocking mechanism meshing with each of said gears so as to drive solely said first biasing roller when the motor is rotatively driven in one direction and drive both said first and second biasing rollers when the motor is rotatively driven in the other direction when an original is set and when the original is transmitted, rocks and meshes with each of said gears so as to drive both said first and second biasing rollers when recording paper is set, when reception is performed and when a copy is made, and rocks and meshes with said gear of said first biasing roller so as to drive said first biasing roller after the recording paper is set, after reception and after copying; and a power transmission mechanism in which said rocking mechanism is arranged in a power transmission gear system for driving said first and second biasing rollers.

3. The apparatus according to claim 2, wherein said rocking mechanism rocks and meshes with said gear of said first biasing roller so as to drive said first biasing roller when a prescribed operation of the facsimile apparatus is commanded to stop.

4. The apparatus according to claim 2, wherein said rocking mechanism rocks and meshes with said gear of said first biasing roller so as to drive said first biasing roller when power is introduced to the facsimile apparatus.

5. The apparatus according to claim 2, wherein the condition $C/P_c = T/P_t$ is satisfied, where $\Phi C$ represents the diameter of the first biasing roller, $\Phi P_c$ the reference pitch circle diameter of a gear provided coaxially on said first biasing gear, $\Phi T$ the diameter of said second biasing gear and $\Phi P_t$ the reference pitch circle diameter of a gear provided coaxially on said second biasing gear.

6. The apparatus according to claim 2, wherein said first biasing roller has a fixed-direction rotating portion which rotates in the same direction regardless of the direction in which said motor rotates.

7. The apparatus according to claim 2, wherein said motor is arranged at a rearward part of said base portion;

said first and second biasing rollers are arranged at a forward part of said base portion, each of said gears is arranged at a side part of said base portion, and said rocking mechanism is arranged between said gears so as to be capable of rocking and meshing with each gear; and a motor speed reduction mechanism common to said first and second biasing rollers is arranged at the side of said motor with respect to said rocking mechanism.

8. The apparatus according to claim 2, wherein said motor is arranged at a rearward part of said base portion in such a manner that an output shaft thereof becomes substantially perpendicular to a bottom surface of said base portion;

said first and second biasing rollers are arranged at a forward part of said base portion, each of said gears is arranged at a side part of said base portion, and said rocking mechanism is arranged between said gears so as to be capable of rocking and meshing with each gear; and a motor speed reduction mechanism common to said first and second biasing rollers is arranged at the side of said motor, and a bevel gear is provided in said motor speed reduction mechanism for converting the direction of said output shaft.

9. The apparatus according to claim 8, wherein said motor is a stepping motor arranged to be flat.

10. A sheet conveying device of a facsimile apparatus, comprising:

a reading roller for reading an original, said reading roller having a first gear for rotating said reading roller;

an intermediate gear meshing with said first gear;

a recording roller for conveying a recording sheet, said recording roller having a second gear for rotating said recording roller;

drive means having a drive gear;

a rocking mechanism rocked in response to forward/reverse rotation of the drive gear;

said rocking mechanism having a sun gear meshing with said drive gear; and a first and second planetary gears, and a bracket member for supporting said first and second planetary gears, and rocks around said sun gear;

wherein said bracket member rocks so as to mesh said first planetary gear with said intermediate gear in response to rotation of said drive gear in one direction, and said bracket member rocks so as to mesh said first planetary gear with said second gear and also to mesh said second planetary gear with said first gear in response to rotation of said driving gear in the other direction.

* * * * *

UNITED STATES PATENT AND TRADEMARK OFFICE
CERTIFICATE OF CORRECTION

PATENT NO. : 5,523,858
DATED : June 4, 1996
INVENTOR(S) : MASAKATSU YAMADA ET AL.          Page 1 of 9

It is certified that error appears in the above-identified patent and that said Letters Patent is hereby corrected as shown below:

COLUMN 1

Line 41, "the," should read --the--.

COLUMN 3

Line 21, "preferred" should read --a preferred--.

COLUMN 6

Line 52, "THP" should read --TPH--.

COLUMN 7

Line 32, "FIG. 4," should read --FIG. 3,--.

COLUMN 8

Line 25, "an" should be deleted.
Line 67, "batter 11." should read --battery 11.--.

COLUMN 9

Line 22, "roller" should read --roll--.
Line 58, "difference" should read --different--.

COLUMN 11

Line 32, "5" should be deleted.

UNITED STATES PATENT AND TRADEMARK OFFICE
CERTIFICATE OF CORRECTION

PATENT NO. : 5,523,858
DATED : June 4, 1996
INVENTOR(S) : MASAKATSU YAMADA ET AL.

It is certified that error appears in the above-identified patent and that said Letters Patent is hereby corrected as shown below:

COLUMN 12

Line 5, "elapsed" should read --elapse--.
Line 14, "page" should read --pages--.
Line 41, "step 30," should read --step S30,--.

COLUMN 14

Line 29, "gear 65." should read --gear 69.--.

COLUMN 16

Line 58, "5" should be deleted.

COLUMN 17

Line 14, "the motor is rotatively" should read
--said reversible motor is--.
Line 16, "the motor is rotatively" should read
--said reversible motor is--.
Line 18, "in which said rocking" should read
--having power transmitting gears which conveys driving force from said reversible motor to said first and second biasing rollers, and having said rocking mechanism arranged between said power transmitting gears, and further having a reduction gear mechanism arranged between said rocking mechanism and said reversible motor,--.
Lines 19 and 20 should be deleted.

UNITED STATES PATENT AND TRADEMARK OFFICE
CERTIFICATE OF CORRECTION

PATENT NO. : 5,523,858
DATED : June 4, 1996
INVENTOR(S) : MASAKATSU YAMADA ET AL.   Page 3 of 9

It is certified that error appears in the above-identified patent and that said Letters Patent is hereby corrected as shown below:

COLUMN 17 continued,

Line 57, "in which said rocking" should read
--having power transmitting gears which conveys driving force from said reversible motor to said first and second biasing rollers, and having said rocking mechanism arranged between said power transmitting gears, and further having a reduction gear mechanism arranged between said rocking mechanism and said reversible motor.--.

Lines 58 and 59 should be deleted.

COLUMN 18

Line 4, "$\Phi C$" should read --C--.
Line 5, "$\Phi P_c$" should read --$P_c$--.
Line 7, "$\Phi T$" should read --T--.
Line 8, "$\Phi P_t$" should read --$P_t$--.
Line 14, "The apparatus according to claim 2," should read
--A facsimile apparatus constructed to have a flat, compact configuration, comprising:
a base portion;
an original reading section having a contact-type line image sensor and a first biasing roller rotatably supported on said base portion so as to be rotated in a state in which said contact-type line image sensor is biased, said first biasing roller having a gear fixed thereto;

UNITED STATES PATENT AND TRADEMARK OFFICE
CERTIFICATE OF CORRECTION

PATENT NO. : 5,523,858
DATED : June 4, 1996
INVENTOR(S) : MASAKATSU YAMADA ET AL.

Page 4 of 9

It is certified that error appears in the above-identified patent and that said Letters Patent is hereby corrected as shown below:

COLUMN 18 continued, a recording section arranged in the vicinity of said original reading section and having a line thermal head and a second biasing roller rotatably supported on said base portion so as to be rotated in a state in which said line thermal head is biased, said second biasing roller having a gear fixed thereto;
        drive means secured to said base portion and having a reversible motor used as a drive source;
        a rocking mechanism meshing with each of said gears so as to drive solely said first biasing roller when the motor is rotatively driven in one direction and drive both said first and second biasing rollers when the motor is rotatively driven in the other direction when an original is set and when the original is transmitted, rocks and meshes with each of said gears so as to drive both said first and second biasing rollers when recording paper is set, when reception is performed and when a copy is made, and rocks and meshes with said gear of said first biasing roller so as to drive said first biasing roller after the recording paper is set, after reception and after copying; and
        a power transmission mechanism in which said rocking mechanism is arranged in a power transmission gear system for driving said first and second biasing rollers,--.

Line 15, "portion;" should read --portion,--.

UNITED STATES PATENT AND TRADEMARK OFFICE
CERTIFICATE OF CORRECTION

PATENT NO. : 5,523,858
DATED : June 4, 1996
INVENTOR(S) : MASAKATSU YAMADA ET AL.   Page 5 of 9

It is certified that error appears in the above-identified patent and that said Letters Patent is hereby corrected as shown below:

COLUMN 18 continued,

Line 16, "said" should read --wherein said--.
Line 20, "gear;" should read --gear,--.
Line 22, "a" should read --wherein a--.
Line 25, "The apparatus according to claim 2," should read
--A facsimile apparatus constructed to have a flat, compact configuration, comprising:
a base portion;
an original reading section having a contact-type line image sensor and a first biasing roller rotatably supported on said base portion so as to be rotated in a state in which said contact-type line image sensor is biased, said first biasing roller having a gear fixed thereto;
a recording section arranged in the vicinity of said original reading section and having a line thermal head and a second biasing roller rotatably supported on said base portion so as to be rotated in a state in which said line thermal head is biased, said second biasing roller having a gear fixed thereto;
drive means secured to said base portion and having a reversible motor used as a drive source;
a rocking mechanism meshing with each of said gears so as to drive solely said first biasing roller when the motor is rotatively driven in one direction and drive both said first and second biasing rollers when the motor is rotatively driven in the other direction when an

UNITED STATES PATENT AND TRADEMARK OFFICE
CERTIFICATE OF CORRECTION

PATENT NO. : 5,523,858
DATED : June 4, 1996
INVENTOR(S) : MASAKATSU YAMADA ET AL.

It is certified that error appears in the above-identified patent and that said Letters Patent is hereby corrected as shown below:

COLUMN 18 continued, original is set and when the original is transmitted, rocks and meshes with each of said gears so as to drive both said first and second biasing rollers when recording paper is set, when reception is performed and when a copy is made, and rocks and meshes with said gear of said first biasing roller so as to drive said first biasing roller after the recording paper is set, after reception and after copying; and
        a power transmission mechanism in which said rocking mechanism is arranged in a power transmission gear system for driving said first and second biasing rollers,--.

Line 28, "portion;" should read --portion,--.
Line 29, "said" should read --wherein said--.
Line 33, "gear;" should read --gear,--.
Line 35, "a" should read --wherein a--.
Line 39, "The apparatus according to claim 8," should read
    --A facsimile apparatus constructed to have a flat, compact configuration, comprising:
        a base portion;
        an original reading section having a contact-type line image sensor and a first biasing roller rotatably supported on said base portion so as to be rotated in a state in which said contact-type line image sensor is biased, said first biasing roller having a gear fixed thereto;

UNITED STATES PATENT AND TRADEMARK OFFICE
CERTIFICATE OF CORRECTION

PATENT NO. : 5,523,858
DATED : June 4, 1996
INVENTOR(S) : MASAKATSU YAMADA ET AL.

It is certified that error appears in the above-identified patent and that said Letters Patent is hereby corrected as shown below:

COLUMN 18 continued, a recording section arranged in the vicinity of said original reading section and having a line thermal head and a second biasing roller rotatably supported on said base portion so as to be rotated in a state in which said line thermal head is biased, said second biasing roller having a gear fixed thereto;

drive means secured to said base portion and having a reversible motor used as a drive source;

a rocking mechanism meshing with each of said gears to as to drive solely said first biasing roller when the motor is rotatively driven in one direction and drive both said first and second biasing rollers when the motor is rotatively driven in the other direction when an original is set and when the original is transmitted, rocks and meshes with each of said gears so as to drive both said first and second biasing rollers when recording paper is set, when reception is performed and when a copy is made, and rocks and meshes with said gear of said first biasing roller so as to drive said first biasing roller after the recording paper is set, after reception and after copying; and a power transmission mechanism in which said rocking mechanism is arranged in a power transmission gear system for driving said first and second biasing rollers,

UNITED STATES PATENT AND TRADEMARK OFFICE
CERTIFICATE OF CORRECTION

PATENT NO. : 5,523,858
DATED : June 4, 1996
INVENTOR(S) : MASAKATSU YAMADA ET AL.    Page 8 of 9

It is certified that error appears in the above-identified patent and that said Letters Patent is hereby corrected as shown below:

COLUMN 18 continued, wherein said motor is arranged at a rearward part of said base portion in such a manner that an output shaft thereof becomes substantially perpendicular to a bottom surface of said base portion,
        wherein said first and second biasing rollers are arranged at a forward part of said base portion, each of said gears is arranged at a side part of said base portion, and said rocking mechanism is arranged between said gears so as to be capable of rocking and meshing with each gear,
        wherein a motor speed reduction mechanism common to said first and second biasing rollers is arranged at the side of said motor, and a bevel gear is provided in said motor speed reduction mechanism for converting the direction of said output shaft,--.

Line 52, "gear;" should read --gear,--.
Line 54, "gear; and" should read
--gear;
        a reduction gear mechanism arranged between said rocking mechanism and said drive gear; and--.

UNITED STATES PATENT AND TRADEMARK OFFICE
CERTIFICATE OF CORRECTION

PATENT NO.  : 5,523,858
DATED       : June 4, 1996
INVENTOR(S) : MASAKATSU YAMADA ET AL.

It is certified that error appears in the above-identified patent and that said Letters Patent is hereby corrected as shown below:

<u>COLUMN 18</u>

Line 55, "a" (first occurrence) should be deleted.

Signed and Sealed this

Thirteenth Day of May, 1997

Attest:

BRUCE LEHMAN

*Attesting Officer*     *Commissioner of Patents and Trademarks*